(12) United States Patent
Ichimura et al.

(10) Patent No.: US 8,364,004 B2
(45) Date of Patent: Jan. 29, 2013

(54) REPRODUCING APPARATUS, DISPLAY APPARATUS, REPRODUCING METHOD, AND DISPLAY METHOD

(75) Inventors: Gen Ichimura, Tokyo (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 464 days.

(21) Appl. No.: 12/449,080

(22) PCT Filed: Nov. 17, 2008

(86) PCT No.: PCT/JP2008/070863
§ 371 (c)(1),
(2), (4) Date: Jul. 22, 2009

(87) PCT Pub. No.: WO2009/066634
PCT Pub. Date: May 28, 2009

(65) Prior Publication Data
US 2010/0067877 A1 Mar. 18, 2010

(30) Foreign Application Priority Data
Nov. 22, 2007 (JP) ................. P2007-303186

(51) Int. Cl.
*H04N 5/932* (2006.01)
*H04N 5/931* (2006.01)
(52) U.S. Cl. ..................... 386/201; 386/207
(58) Field of Classification Search ............. None
See application file for complete search history.

(56) References Cited

U.S. PATENT DOCUMENTS

| 7,511,763 | B2 | 3/2009 | Sasaki | |
|---|---|---|---|---|
| 2002/0174440 | A1 | 11/2002 | Usuba et al. | |
| 2007/0046697 | A1* | 3/2007 | Hussain | 345/649 |
| 2007/0230909 | A1* | 10/2007 | Mukaide et al. | 386/96 |

FOREIGN PATENT DOCUMENTS

| JP | 09-069987 A | 3/1997 |
|---|---|---|
| JP | 2001-168887 A | 6/2001 |
| JP | 2002-344898 A | 11/2002 |
| JP | 2006-033436 A | 2/2006 |
| JP | 2007-221422 A | 8/2007 |
| JP | 2007-267116 A | 10/2007 |

* cited by examiner

*Primary Examiner* — William C. Vaughn, Jr.
*Assistant Examiner* — Asher Khan
(74) *Attorney, Agent, or Firm* — Lerner, David, Littenberg, Krumholz & Mentlik, LLP

(57) ABSTRACT

A transport signal transmitted from a television receiver apparatus 720 through a signal line 708 is subjected to a separation operation by a transport-signal processor 713 and decoded by a video-signal decoding unit 714 and an audio-signal decoding unit 715. A decoded video signal is supplied through a signal line 701 to the television receiver apparatus 720. Video processing time of the television receiver apparatus 720 is obtained by a delay-information obtaining unit 716 through a signal line 703. An audio-signal delaying unit 717 delays an audio signal decoded by the audio-signal decoding unit 715 in accordance with the video processing time obtained by the delay-information obtaining unit 716 and outputs the audio signal to a speaker 750.

25 Claims, 20 Drawing Sheets

FIG. 2

| PIN NUMBER | SIGNAL NAME |
| --- | --- |
| 1 | TMDS DATA 2 POSITIVE ELECTRODE |
| 2 | TMDS DATA 2 SHIELD |
| 3 | TMDS DATA 2 NEGATIVE ELECTRODE |
| 4 | TMDS DATA 1 POSITIVE ELECTRODE |
| 5 | TMDS DATA 1 SHIELD |
| 6 | TMDS DATA 1 NEGATIVE ELECTRODE |
| 7 | TMDS DATA 0 POSITIVE ELECTRODE |
| 8 | TMDS DATA 0 SHIELD |
| 9 | TMDS DATA 0 NEGATIVE ELECTRODE |
| 10 | TMDS CLOCK POSITIVE ELECTRODE |
| 11 | TMDS CLOCK SHIELD |
| 12 | TMDS CLOCK NEGATIVE ELECTRODE |
| 13 | CEC |
| 14 | RESERVED |
| 15 | SCL (DDC SERIAL CLOCK) |
| 16 | SDA (DDC SERIAL DATA) |
| 17 | DDC/CEC GROUND |
| 18 | ELECTRIC POWER (+5V) |
| 19 | HPD (HOT PLUG DETECT) |

FIG. 4
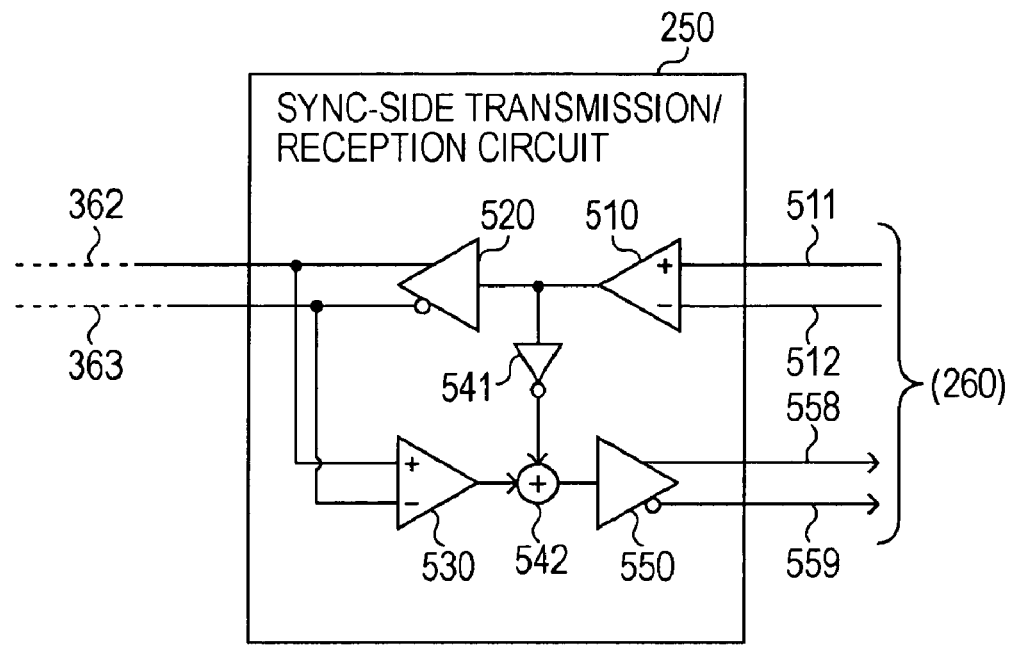
(a)
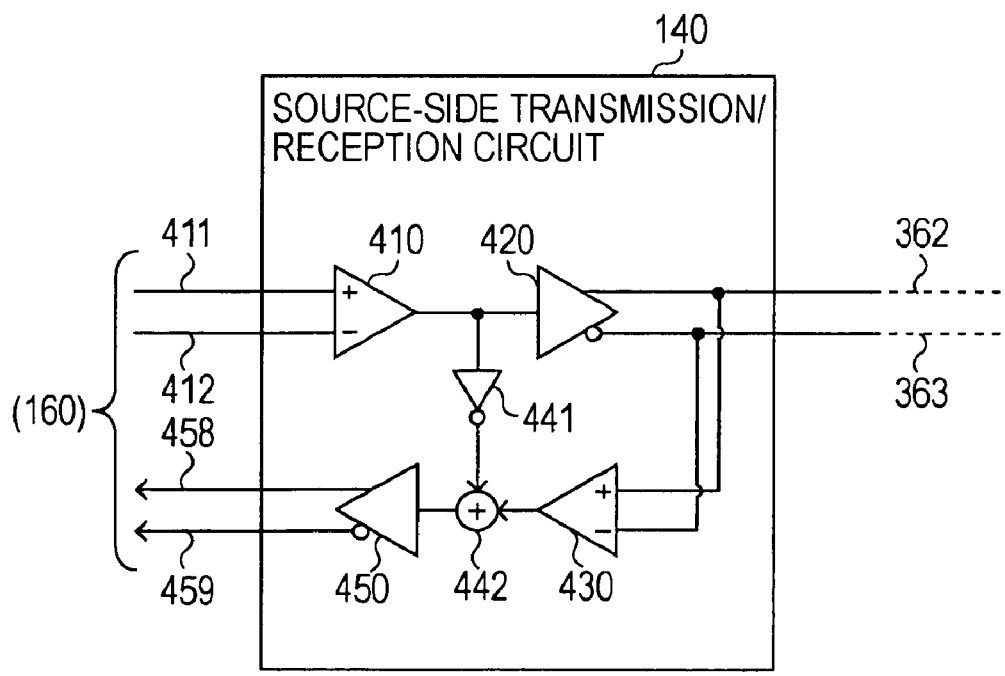
(b)

FIG. 5
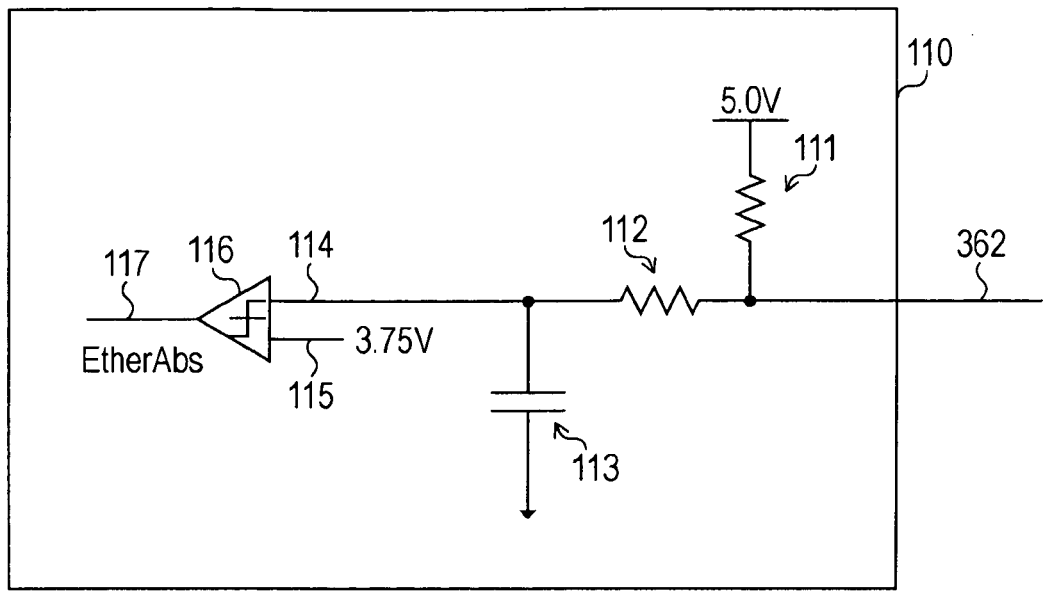
(a)
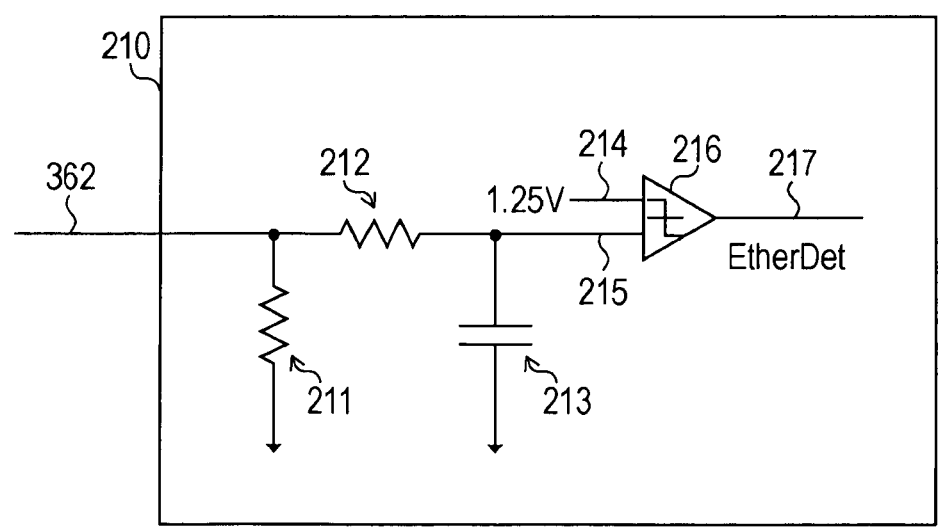
(b)

FIG. 6
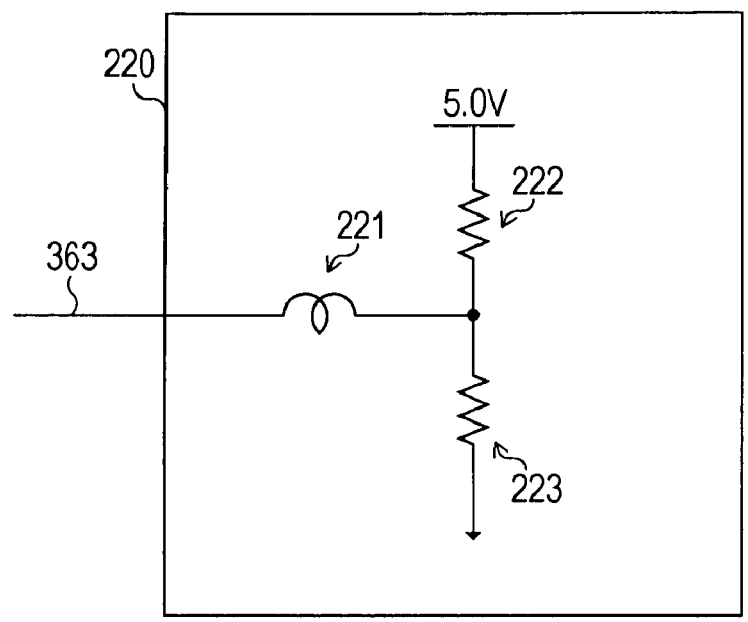
(a)
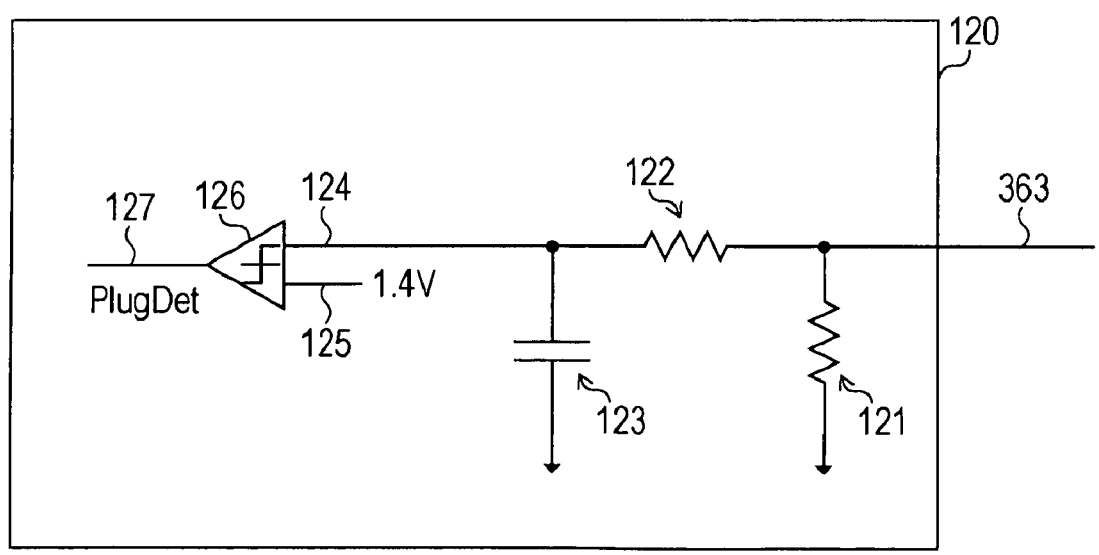
(b)

FIG. 9

| bit | 7 | 6 | 5 | 4 | 3 | 2 | 1 | 0 |
|---|---|---|---|---|---|---|---|---|
| 0 | VENDER TAG CODE ("3") | | | BLOCK LENGTH (N) | | | | |
| 1-3 | LICENSOR IDENTIFIER | | | | | | | |
| 4-5 | PHYSICAL ADDRESS | | | | | | | |
| 6-8 | EXPANSION INFORMATION | | | | | | | |
| 9 | VIDEO DELAY AMOUNT | | | | | | | |
| 10 | AUDIO DELAY AMOUNT | | | | | | | |
| 11 | INTERLACE VIDEO DELAY AMOUNT | | | | | | | |
| 12 | INTERLACE AUDIO DELAY AMOUNT | | | | | | | |
| N | (RESERVED) | | | | | | | |

FIG. 16
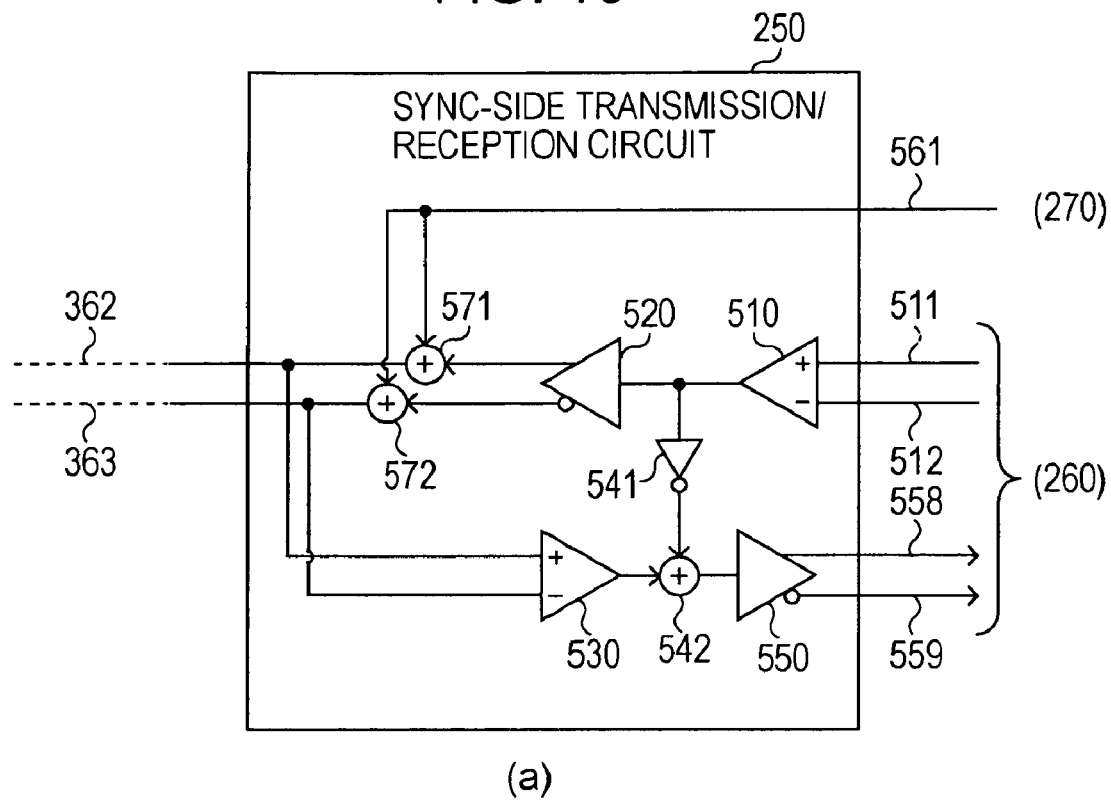
(a)
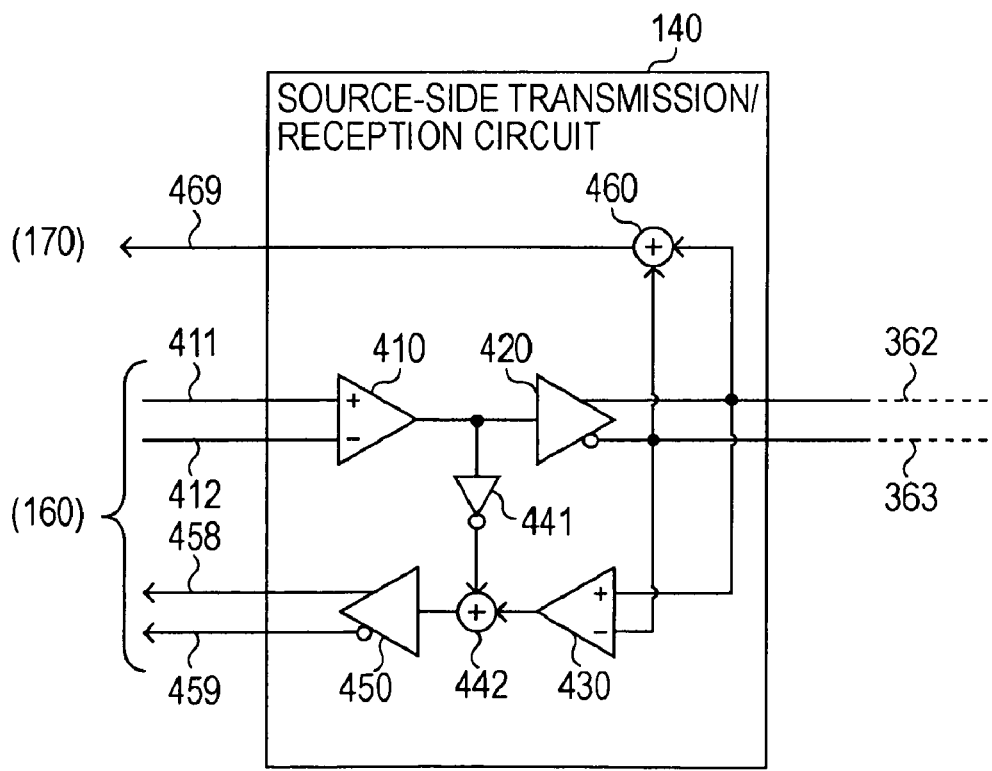
(b)

REPRODUCING APPARATUS, DISPLAY APPARATUS, REPRODUCING METHOD, AND DISPLAY METHOD

CROSS-REFERENCES TO RELATED APPLICATIONS

The present application is a national phase entry under 35 U.S.C. §371 of International Application No. PCT/JP2008/070863 filed Nov. 17, 2008, published on May 28, 2009 as WO 2009/066634 A1, which claims priority from Japanese Patent Application No. JP 2007-303186 filed in the Japanese Patent Office on Nov. 22, 2007.

TECHNICAL FIELD

The present invention relates to reproducing apparatuses and display apparatuses, and particularly relates to a reproducing apparatus and a display apparatus which reproduce and display digital signals, such as audio signals and video signals, and processing methods thereof.

BACKGROUND OF THE INVENTION

In recent years, as AV (Audio/Visual) apparatuses using digital signals, such as audio signals and video signals, have been broadly used, various methods have been proposed as interfaces for transmitting digital signals among the AV apparatuses. As such an interface, an IEEE (Institute of Electrical and Electronics Engineers) 1394 standard and an HDMI (High-Definition Multimedia Interface) standard (HDMI is a registered trademark), for example, are generally known (refer to Patent Document 1, for example.)

When AV apparatuses are connected to each other using such an interface, it is assumed that video images are displayed using a television receiver apparatus and sound is output from an AV amplifier. In this case, since video processing time of the television receiver apparatus and audio processing time of the AV amplifier are different from each other, there arises a problem in that time lag occurs between a video image and sound. To address this problem, a system, for example, which attains synchronization (lip sync) between a reproduced video image and reproduced sound by supplying processing time for video-image processing in accordance with the HDMI standard from the television receiver apparatus to the AV amplifier so that processing of audio signals is delayed has been proposed (refer to Patent Document 2, for example).
Patent Document 1: Japanese Unexamined Patent Application Publication No. 2007-267116 (FIG. 1)
Patent Document 2: Japanese Unexamined Patent Application Publication No. 2006-033436 (FIG. 1)

SUMMARY OF THE INVENTION

When AV apparatuses are connected to each other in accordance with the HDMI standard, video signals and audio signals are transmitted by means of a serial transmission method referred to as TMDS (Transition Minimized Differential Signaling). In this TMDS, the transmission direction is one way so that high-speed transmission is performed. Therefore, depending on a connection state of the apparatuses, sound may not be output from an apparatus desired by a user. Furthermore, some apparatuses may not independently decode digital signals by themselves, and in this case, the decoding processing should be entrusted to another apparatus. In this case also, the lip sync described above should be taken into consideration.

The present invention has been made in view of such situations, and an object of the present invention is to flexibly perform decoding processing on video signals and audio signals in a system employing an interface based on one-way transmission, such as the HDMI standard.

The present invention has been made to solve the above problem, and a first aspect of the present invention is to provide a reproducing apparatus and a reproducing method thereof, the reproducing apparatus being characterized by including separation means for receiving a stream signal including an encoded video signal and an encoded audio signal from a stream generation apparatus and separates the encoded video signal and the encoded audio signal from the stream signal, video-signal decoding means for decoding the encoded video signal and outputting the decoded video signal to a video-image outputting apparatus, audio-signal decoding means for decoding the encoded audio signal so as to generate an audio signal, and audio-signal processing means for obtaining a period of time required for processing the video signal in the video-image outputting apparatus as video processing time, delaying the audio signal in accordance with the video processing time, and thereafter supplying the delayed audio signal to an audio outputting apparatus. By this, an operation of delaying the audio signal included in the stream signal received from the stream generation apparatus in accordance with the period of time required for processing the video signal in the video-image outputting apparatus is realized.

In the first aspect, the audio-signal processing means may obtain the video processing time through a control signal line connected between the audio-signal processing means and the video-image outputting apparatus. The control signal line may be realized by a display data channel (DDC) included in an HDMI cable.

Furthermore, in the first aspect, the separation means may receive the stream signal through a data signal line connected between the separation means and the stream generation apparatus. In this case, assuming that the stream generation apparatus is included in the video-image outputting apparatus, the audio-signal processing means may obtain the video processing time through the data signal line. Moreover, in this case, the data signal line may correspond to a reserved line and a hot-plug detection line included in an HDMI cable.

Furthermore, in the first aspect, the audio-signal decoding means may output the decoded audio signal to the video-image outputting apparatus, and the audio-signal processing means may measure a temporal difference between an audio signal returned from the video-image outputting apparatus and the audio signal decoded by the audio-signal decoding means as the video processing time. By this, an operation of delaying the decoded audio signal in accordance with a temporal difference between an audio signal returned from the video-image outputting apparatus and the decoded audio signal is realized. In this case, the reproducing apparatus may further include first reception means for extracting the stream signal from a difference signal received through a data signal line connected between the first reception means and the video-image outputting apparatus, and second reception means for extracting the returned audio signal from an in-phase signal received through the data signal line. By this, an operation of transmitting the stream signal and the audio signal through the same data signal line is realized. Moreover, in this case, the data signal line may be realized by a reserved line and a hot-plug detection line included in an HDMI cable.

A second aspect of the present invention is to provide a display apparatus and a display method thereof, the display apparatus is being characterized by including: stream-signal generation means for generating a stream signal including an encoded video signal and an encoded audio signal, connection-information management means for managing connection information regarding a state of connection to another apparatus, stream-signal switching means for determining whether a decoding apparatus which decodes the stream signal has been connected in accordance with the connection information, and performing switching so that the decoding apparatus outputs the stream signal when the decoding apparatus is connected, display control means for receiving a video signal decoded by the decoding apparatus and displaying the video signal in display means, and video-processing-time supplying means for supplying a period of time required for processing the video signal performed by the display control means to the decoding apparatus as video processing time. By this, an operation of transmitting a request for decoding processing to another decoding apparatus in accordance with a state of connection to another apparatus is realized.

Furthermore, in the second aspect, the display apparatus may further include separation means for separating the encoded video signal and the encoded audio signal from the stream signal, and video-signal decoding means for decoding the encoded video signal so as to generate a video signal. The stream-signal switching means may perform switching so that the stream signal is output to the separation means when the decoding apparatus is not connected, and the display control means may display a video signal decoded by the decoding apparatus in the display means when the decoded apparatus is connected whereas the display control means may display the video signal decoded by the video-signal decoding means in the display means when the decoding apparatus is not connected. By this, an operation of selecting the video-signal decoding means or another decoding apparatus to decode the encoded video signal is realized.

Moreover, in the second aspect, the display apparatus may further include n video-signal decoding means (n is an integer equal to or larger than 0) for decoding the encoded video signal. By this, an operation of displaying video images corresponding to the number of video signals larger than the number of the video-signal decoding means is realized.

Furthermore, in the second aspect, the video-processing-time supplying means may supply the video processing time through a control signal line connected between the video-processing time supplying means and the decoding apparatus. In this case, the control signal line may be realized by a display data channel (DDC) included in an HDMI cable.

Moreover, in the second aspect, the display apparatus further includes audio-signal returning means for receiving an audio signal decoded by the decoding apparatus and returning, at a timing when a video signal decoded by the decoding apparatus is displayed in the display means, the audio signal corresponding to the video signal to the decoding apparatus. By this, an operation of measuring a period of time required for processing the video signal in the display apparatus by the decoding apparatus is realized. In this case, the display apparatus may further includes first transmission means for transmitting the stream signal through a data signal line connected between the first transmission means and the decoding apparatus as a differential signal, and second transmission means for superimposing an audio signal returned by the audio-signal returning means on the data signal line as an in-phase signal and transmitting the superimposed audio signal to the decoding apparatus. By this, an operation of transmitting the stream signal and the audio signal through the same data signal line is realized. In this case, the data signal line may be realized by a reserved line and a hot-plug detection line included in an HDMI cable.

According to the present invention, an advantage in which decoding processing is flexibly performed on a video signal and an audio signal in a system using an interface based on a single-direction transmission, such as an HDMI standard, is obtained.

BRIEF DESCRIPTION OF THE DRAWINGS

FIG. 2 is a diagram illustrating an example of arrangement of pins of a connector complying with the HDMI standard.

FIG. 4 show diagrams illustrating examples of configurations of a source-side transmission/reception circuit 140 and a sync-side transmission/reception circuit 250 according to the embodiment of the present invention.

FIG. 5 show diagrams illustrating examples of configurations of a sync-apparatus-type detection circuit 110 and a source-apparatus-type detection circuit 210 according to the embodiment of the present invention.

FIG. 6 show diagrams illustrating examples of configurations of a plug-connection detection circuit 120 and a plug-connection transmission circuit 220 according to the embodiment of the present invention.

FIG. 9 is a diagram illustrating an example of a data configuration stored in a delay information storage unit 721 according to the embodiment of the present invention.

FIG. 16 show diagrams illustrating examples of modifications of configurations of the source-side transmission/reception circuit 140 and the sync-side transmission/reception circuit 250 according to the embodiment of the present invention.

BEST MODE FOR CARRYING OUT THE INVENTION

An embodiment of the present invention will now be described with reference to the accompanying drawings. Here, assuming that an interface complying with an HDMI standard is employed, a system in which a request of decoding processing is transmitted between apparatuses connected with each other through the interface will be described.

Figure 1:
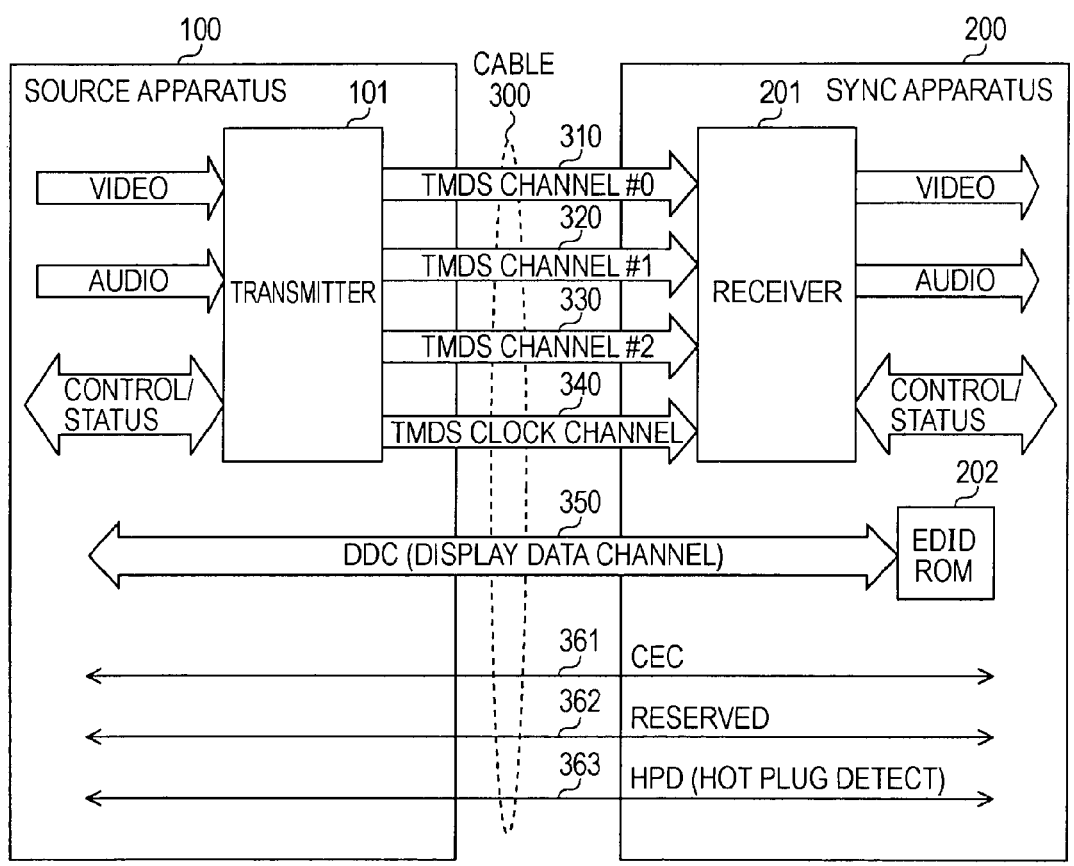
FIG. 1 is a diagram schematically illustrating a configuration of an interface complying with an HDMI standard.

FIG. 1 is a diagram schematically illustrating a configuration of an interface complying with an HDMI standard. In the HDMI standard, a transmission direction of a basic high-speed transmission line is determined to be a single direction, and a transmission-side apparatus is referred to as a source apparatus and a reception-side apparatus is referred to as a sync apparatus. In this example, a source apparatus 100 and a sync apparatus 200 are connected to each other through an HDMI cable 300. Furthermore, the source apparatus 100 includes a transmitter 101 which performs a transmitting operation, and the sync apparatus 200 includes a receiver 201 which perform a receiving operation.

For the transmission between the transmitter 101 and the receiver 201, a TMDS serial transmission method is employed. In the HDMI standard, video signals and audio signals are transmitted using three TMDS channels 310 to 330. That is, in an effective image period which is defied as a period excepting a horizontal blanking period and a vertical blanking period from a period from when a certain vertical synchronization signal is supplied to when the next vertical synchronization signal is supplied, a differential signal corresponding to pixel data of an image for one screen which has not been compressed is transmitted in a single direction to the sync apparatus 200 through the TMDS channels 310 to 330. Furthermore, in the horizontal blanking period or the vertical blanking period, a differential signal corresponding to audio data, control data, or other auxiliary data is transmitted in a single direction to the sync apparatus 200 through the TMDS channels 310 to 330.

In the HDMI standard, a clock signal is transmitted through a TMDS clock channel 340. Each of the TMDS channels 310 to 330 transmits image data of 10 bits in one clock in which the TMDS clock channel 340 performs transmission.

DETAILED DESCRIPTION

Furthermore, in the HDMI standard, a display data channel (DDC) 350 is provided. The display data channel 350 is used when a source apparatus reads E-EDID (Enhanced Extended Display Identification Data) information of the sync apparatus 200. The E-EDID information corresponds to, when the sync apparatus 200 is a display apparatus, information on setting including a type of the apparatus, resolution, a color characteristic, and timing, and performance. The E-EDID information is stored in an EDID ROM 202. Note that, although not shown, as with the sync apparatus 200, the source apparatus 100 may store the E-EDID information and transmits the E-EDID information to the sync apparatus 200 as needed.

Moreover, in the HDMI standard, a CEC (Consumer Electronics Control) line 361, a reserved line 362, and a HPD (Hot Plug Detect) line 363, for example, are provided. The CEC line 361 is a line used for bi-directional communication of apparatus-control signals. The display data channel 350 is used for one-to-one connection between apparatuses whereas the CEC line 361 is used for direct connection to all apparatuses connected to the HDMI.

The reserved line 362 is a line which is not used in the HDMI standard. The HPD line 363 is a line used to detect connection (Hot Plug) to another apparatus through a cable complying with the HDMI. In this embodiment of the present invention, it is assumed that Ethernet (registered trademark) signals are transmitted using the reserved line 362 and the HPD line 363.

FIG. 2 is a diagram illustrating an example of arrangement of pins of a connector complying with the HDMI standard. Here, the relationship between a pin number 301 and a signal name 302 in a pin arrangement referred to as a type A is shown.

Each of the TMDS channels 310 to 330 and the TMDS clock channel 340 includes three pins for a positive electrode, a shield, and a negative electrode. The first to third pins correspond to the TMDS channel 330, the fourth to sixth pins correspond to the TMDS channel 320, the seventh to ninth pins correspond to the TMDS channel 310, and the 10th to 12th correspond to the TMDS clock channel 340.

Furthermore, the 13th pin, the 14th pin, and the 19th pin correspond to the CEC line 361, the reserved line 362, and the HPD line 363, respectively. Moreover, the display data channel 350 includes three pins for a serial clock (SCL), serial data (SDA), and the ground which correspond to the 15th to 17th pins, respectively. Note that, the ground (the 17th pin) of the display data channel 350 is shared by the ground of the CEC line 361. The 18th pin corresponds to a power supply line (+5 V).

Figure 3:
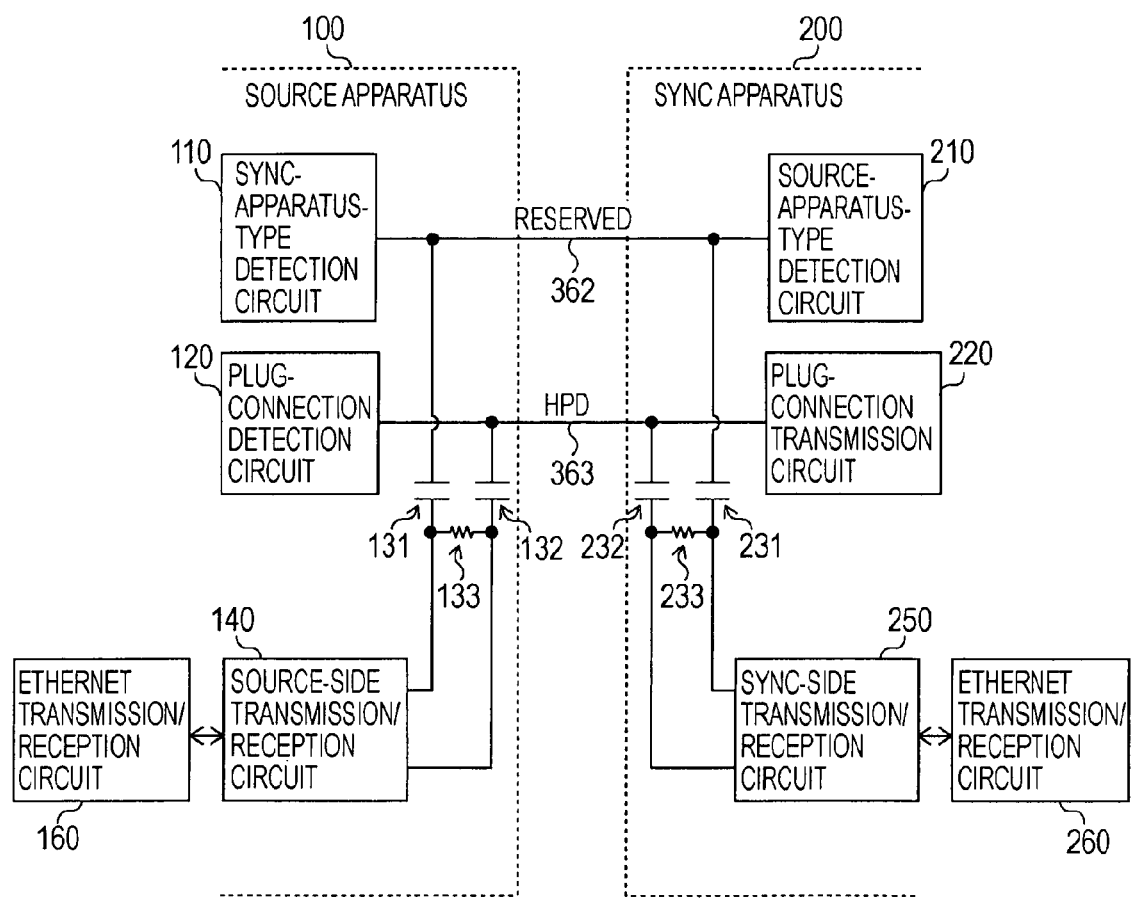
FIG. 3 is a diagram illustrating examples of internal configurations of a source apparatus 100 and a sync apparatus 200 according to an embodiment of the present invention.

FIG. 3 is a diagram illustrating examples of internal configurations of the source apparatus 100 and the sync apparatus 200 according to the embodiment of the present invention. Here, configurations regarding the reserved line 362 and the HPD line 363 are shown. The source apparatus 100 includes a sync-apparatus-type detection circuit 110, a plug-connection detection circuit 120, a source-side transmission/reception circuit 140, and an Ethernet (registered trademark) transmission/reception circuit 160. Furthermore, the sync apparatus 200 includes a source-apparatus-type detection circuit 210, a plug-connection transmission circuit 220, a sync-side transmission/reception circuit 250, and an Ethernet (registered trademark) transmission/reception circuit 260.

Although the reserved line 362 is not used in the HDMI standard as described above, it is used here to detect a type of an apparatus to be connected, for effective use of the pins. That is, the sync-apparatus-type detection circuit 110 of the source apparatus 100 detects a type of the sync apparatus 200 through the reserved line 362. Furthermore, the source-apparatus-type detection circuit 210 of the sync apparatus 200 detects a type of the source apparatus 100 through the reserved line 362. It is assumed that a type of an apparatus (hereinafter referred to as an HDMI expanded apparatus) which enables bi-directional transmission of Ethernet (registered trademark) signals through the reserved line 362 and the HPD line 363 in accordance with an expanded HDMI standard is employed as the types of the apparatuses.

The HPD line 363 is used to detect connection to another apparatus using the HDMI cable as described above. The plug-connection transmission circuit 220 of the sync apparatus 200 transmits information on a connection of the sync apparatus 200 by biasing a predetermined voltage to a terminal connected to the HPD line 363. The plug-connection detection circuit 120 of the source apparatus 100 detects a connection of the sync apparatus 200 by comparing a potential of a terminal connected to the HPD line 363 with a reference potential.

In the embodiment of the present invention, each of the source-side transmission/reception circuit 140 and the sync-side transmission/reception circuit 250 are connected to the reserved line 362 and the HPD line 363 which have functions as described above. That is, the source-side transmission/reception circuit 140 of the source apparatus 100 is connected to the reserved line 362 and the HPD line 363 through capacitors 131 and 132, respectively, and a resistor 133. Furthermore, the sync-side transmission/reception circuit 250 of the sync apparatus 200 is connected to the reserved line 362 and the HPD line 363 through capacitors 231 and 232, respectively, and a resistor 233.

The source-side transmission/reception circuit 140 is used to connect Ethernet (registered trademark) signals transmitted through the reserved line 362 and the HPD line 363 in a bi-direction manner to the Ethernet transmission/reception circuit 160.

The sync-side transmission/reception circuit 250 is used to connect Ethernet (registered trademark) signals transmitted through the reserved line 362 and the HPD line 363 in a bi-direction manner to the Ethernet transmission/reception circuit 260.

The Ethernet (registered trademark) transmission/reception circuits 160 and 260 transmit and receive Ethernet (registered trademark) signals, and perform bi-directional communication complying with an internet protocol (IP), for example. In this case, as an upper layer of the internet protocol (IP), a TCP (Transmission Control Protocol) and a UDP (User Datagram Protocol) may be used. The Ethernet transmission/reception circuits 160 and 260 are realized by the related art.

FIG. 4 is a diagram illustrating examples of configurations of the source-side transmission/reception circuit 140 and the sync-side transmission/reception circuit 250 according to the embodiment of the present invention.

As shown in (a) of FIG. 4, the sync-side transmission/reception circuit 250 includes amplifiers 510, 520, 530, and 550, an inverter 541, and an adder 542.

The amplifier 510 amplifies signals supplied from the Ethernet (registered trademark) transmission/reception circuit 260 through signal lines 511 and 512. Signals supplied from the signal lines 511 and 512 are differential signals, and the amplifier 510 operates by differential input.

The amplifier 520 amplifies outputs of the amplifier 510. Outputs from the amplifier 520 correspond to differential signals, and a positive signal is supplied to the reserved line 362 and a negative signal is supplied to the HPD line 363.

The amplifier 530 amplifies signals supplied from the reserved line 362 and the HPD line 363. The signals supplied from the reserved line 362 and the HPD line 363 correspond to differential signals, and the amplifier 530 operates by differential input.

The inverter 541 corresponds to a circuit which inverts an output of the amplifier 510. The adder 542 corresponds to a circuit which adds an output of the inverter 541 and an output of the amplifier 530 to each other. That is, the inverter 541 and the adder 542 are used to supply a signal obtained by removing an output signal of the sync apparatus 200 from signals of the HPD line 363 and the reserved line 362 to the amplifier 550.

The amplifier 550 amplifies an output of the adder 542. Outputs of the amplifier 550 are differential signals, and a positive signal is supplied to a signal line 558, and a negative signal is supplied to a signal line 559. The Ethernet (registered trademark) transmission/reception circuit 260 is connected to the signal lines 558 and 559, and a signal obtained by removing a signal output from the sync apparatus 200 from signals supplied from the reserved line 362 and the HPD line 363 is supplied to the Ethernet (registered trademark) transmission/reception circuit 260.

As shown in (b) of FIG. 4, the source-side transmission/reception circuit 140 includes amplifiers 410, 420, 430, and 450, an inverter 441, and an adder 442. The source-side transmission/reception circuit 140 has a configuration the same as that of the sync-side transmission/reception circuit 250. The amplifiers 410, 420, 430, and 450, the inverter 441, and the adder 442 correspond to the amplifiers 510, 520, 530, and 550, the inverter 541, and the adder 542, respectively. The Ethernet (registered trademark) transmission/reception circuit 160 is connected to the amplifiers 410 and 450.

FIG. 5 is a diagram illustrating examples of configurations of the sync-apparatus-type detection circuit 110 and the source-apparatus-type detection circuit 210 according to the embodiment of the present invention.

As shown in (a) of FIG. 5, the sync-apparatus-type detection circuit 110 includes resistors 111 and 112, a capacitor 113, and a comparator 116. The resistor 111 is used to pull up the reserved line 362 to +5V. The resistor 111 is included only when the source apparatus 100 is an apparatus of a specific type (for example, an extended HDMI apparatus), and the pull-up operation is not performed when the source apparatus 100 is not the apparatus of the specific type. The resistor 112 and the capacitor 113 constitute a low-pass filter. An output of the low-pass filter is supplied to a signal line 114. The comparator 116 compares a DC potential supplied from the low-pass filter to the signal line 114 with a reference potential applied to a signal line 115.

As shown in (b) of FIG. 5, the source-apparatus-type detection circuit 210 includes resistors 211 and 212, a capacitor 213, and a comparator 216. The resistor 211 is used to pull down the reserved line 362 to the ground potential. The resistor 211 is included only when the sync apparatus 200 is an apparatus of the specific type, and the pull-down operation is not performed when the sync apparatus 200 is not the apparatus of the specific type. The resistor 212 and the capacitor 213 constitute a low-pass filter. An output of the low-pass filter is supplied to a signal line 215. The comparator 216 compares a DC potential supplied from the low-pass filter to the signal line 215 with a reference potential applied to a signal line 214.

When the sync apparatus 200 is the apparatus of the specific type, the resistor 211 performs the pull-down operation, and therefore, the potential of the reserved line 362 is down to 2.5 V whereas when the sync apparatus 200 is not the apparatus of the specific type, the reserved line 362 is opened and the potential thereof is up to 5 V. Accordingly, assuming that the reference potential of the signal line 115 is set to 3.75 V, the type of the sync apparatus 200 is identified by the source apparatus 100 in accordance with an output of a signal line 117.

Similarly, when the source apparatus 100 is the apparatus of the specific type, the resistor 111 performs the pull-up operation, and therefore, the potential of the reserved line 362 is up to 2.5 V whereas when the source apparatus 100 is not the apparatus of the specific type, the potential of the reserved line 362 is down to 0 V. Accordingly, assuming that the reference potential of the signal line 214 is set to 1.25 V, the type of the source apparatus 100 is identified by the sync apparatus 200 in accordance with an output of a signal line 217.

These signals used to detect the types of the apparatuses are transmitted with DC bias potentials, and do not affect Ethernet (registered trademark) signals transmitted as AC signals.

FIG. 6 show diagrams illustrating examples of configurations of the plug-connection detection circuit 120 and the plug-connection transmission circuit 220 according to the embodiment of the present invention.

As shown in (a) FIG. 6, the plug-connection transmission circuit 220 includes a choke coil 221 and resistors 222 and 223. The choke coil 221 and the resistors 222 and 223 are used to bias the HPD line 363 to approximately 4 V, for example.

Furthermore, as shown in (b) of FIG. 6, the plug-connection detection circuit 120 includes resistors 121 and 122, a capacitor 123, and a comparator 126. The resistor 121 is used to pull down the HPD line 363 to the ground potential. The resistor 122 and the capacitor 123 constitute a low-pass filter. An output of the low-pass filter is supplied to a signal line 124. The comparator 126 compares a DC potential supplied from the low-pass filter to the signal line 124 with a reference potential applied to a signal line 125.

Here, it is assumed that a reference potential of 1.4 V is applied to the signal line 125. When the source apparatus 100 is not connected to the HPD line 363, the input potential is pulled down by the resistor 121, and accordingly, the potential of the signal line 124 becomes lower than the reference potential of the signal line 125. On the other hand, when the source apparatus 100 is connected to the HPD line 363, the input potential is biased to 4 V, and accordingly, the potential of the signal line 124 becomes higher than the reference potential of the signal line 125. Consequently, in accordance with an output from a signal line 127, the source apparatus 100 detects whether the sync apparatus 200 is connected.

These signals used for plug-connection detection are transmitted with DC bias potentials, and do not affect Ethernet (registered trademark) signals transmitted as AC signals.

Next, an example of a system configuration when an HDMI expanded apparatus is connected through the interface described above will be described.

Figure 7:
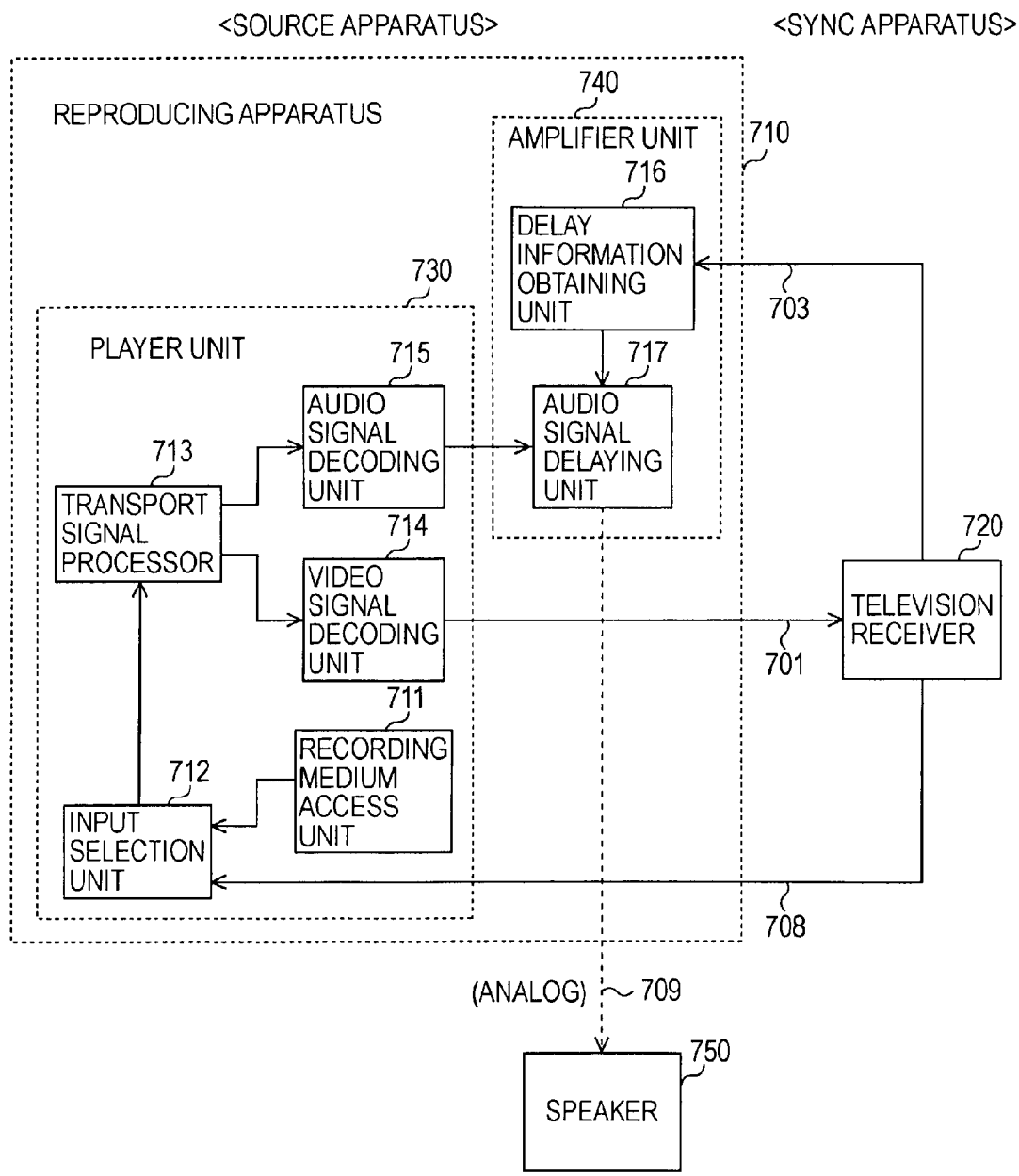
FIG. 7 is a diagram illustrating an example of a configuration of a reproducing apparatus 710 according to the embodiment of the present invention.

FIG. 7 is a diagram illustrating an example of a configuration of a reproducing apparatus 710 according to the embodiment of the present invention. In this example of the system configuration, the reproducing apparatus 710 and a television receiver apparatus 720 are connected to each other through the interface described above, and the reproducing apparatus 710 functions as a source apparatus and the television receiver apparatus 720 functions as a sync apparatus. A signal line 701 corresponds to the TMDS channels 310 to 330, a signal line 703 corresponds to the display data channel 350, and a signal line 708 corresponds to the reserved line 362 and the HPD line 363. Furthermore, a speaker 750 is connected to the reproducing apparatus 710 through an analog signal line 709.

The reproducing apparatus 710 includes a player unit 730 which reproduces video signals and audio signals recorded in a recording medium and an amplifier unit 740 which amplifies the audio signals. The player unit 730 includes a recording-medium access unit 711, an input selection unit 712, a transport-signal processor 713, a video-signal decoding unit 714, and an audio-signal decoding unit 715. The amplifier unit 740 includes a delay-information obtaining unit 716 and an audio-signal delaying unit 717.

The recording-medium access unit 711 reads signals including the video signals and the audio signals from the recording medium. Here, it is assumed that a Blu-ray Disc ((registered trademark): BD) is employed as the recording medium. In the Blu-ray Disc, signals (transport signals) complying with a transport stream (TS) method of MPEG (Moving Picture Expert Group)-2 are recorded, and the recording-medium access unit 711 reads the transport signals and supplies them to the input selection unit 712.

The input selection unit 712 selects a transport signal supplied from the television receiver apparatus 720 through the signal line 708 or a transport signal supplied from the recording-medium access unit 711, and supplies the selected signal to the transport-signal processor 713.

The transport-signal processor 713 separates an encoded video signal and an encoded audio signal from the transport signal supplied from the input selection unit 712. In the transport stream method of MPEG-2, a video signal and an audio signal are encoded and transmitted as a TS packet. That is, the transport-signal processor 713 generates an encoded elementary stream (ES) of the video signal and an encoded elementary stream of the audio signal from the TS packet.

The video-signal decoding unit 714 decodes the encoded video signal obtained through the separation operation of the transport-signal processor 713. The video signal decoded by the video-signal decoding unit 714 is supplied through the signal line 701 to the television receiver apparatus 720.

The audio-signal decoding unit 715 decodes the encoded audio signal obtained through the separation operation of the transport-signal processor 713. The audio signal decoded by the audio-signal decoding unit 715 is supplied to the audio-signal delaying unit 717.

The delay-information obtaining unit 716 obtains a period of time (video processing time) required for processing the video signal performed by the television receiver apparatus 720 as delay information from the television receiver apparatus 720 through the signal line 703. In the HDMI standard, a period of time required for processing the video signal and the audio signal performed is stored in the sync apparatus as part of E-EDID (Enhanced Extended Display Identification Data) configuration, and is supplied to the source apparatus through the display data channel (DDC). Note that, as another embodiment, the video processing time may be obtained through transmission paths (the reserved line 362 and the HPD line 363) for Ethernet (registered trademark) signals.

The audio-signal delaying unit 717 delays the audio signal supplied from the audio-signal decoding unit 715 in accordance with the delay information (video processing time) obtained by the delay-information obtaining unit 716. The delayed audio signal is amplified so as to be an analog signal and output to the speaker 750 through the analog signal line 709.

The speaker 750 outputs the audio signal supplied from the audio-signal delaying unit 717 as sound.

Figure 8:
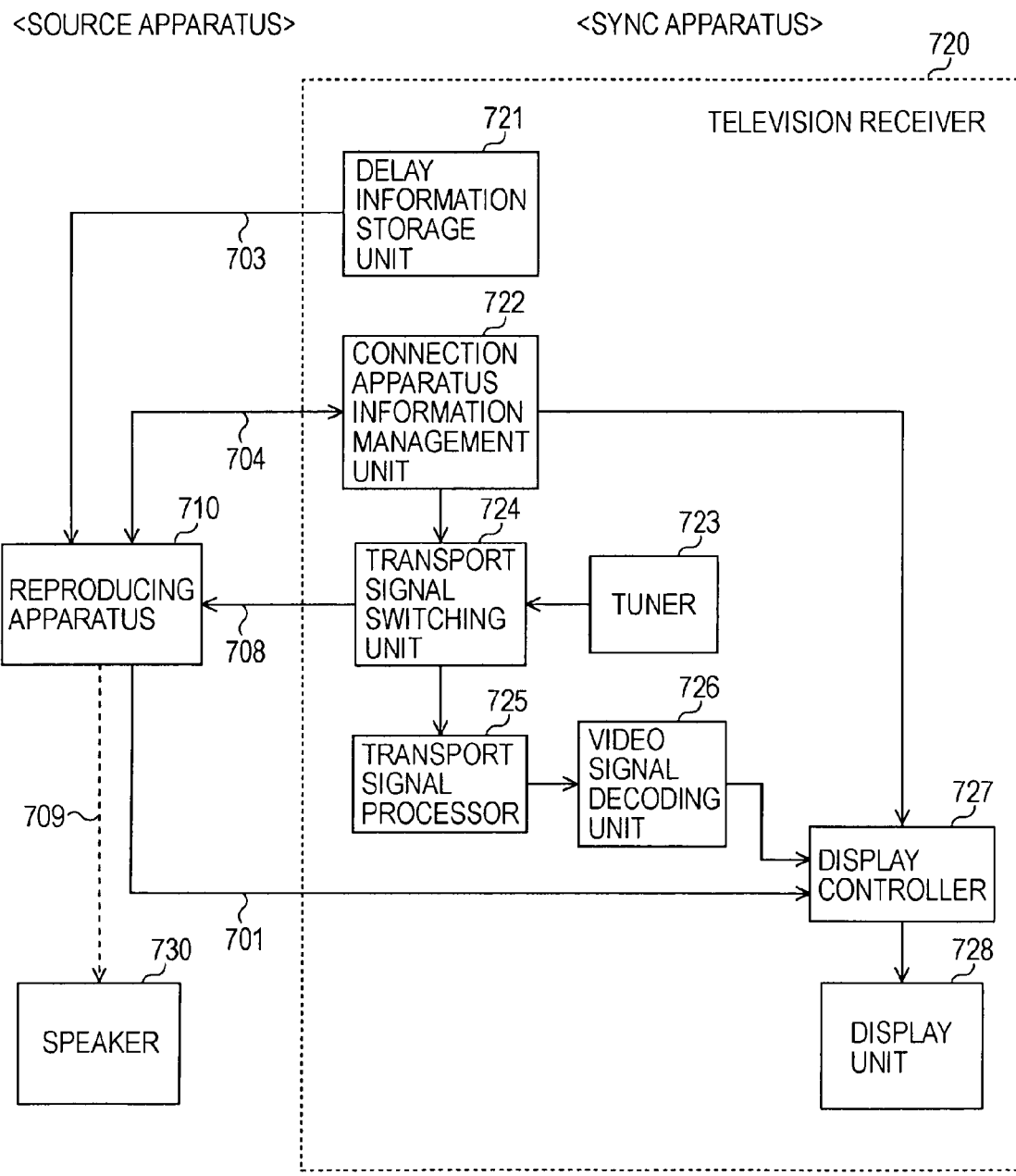
FIG. 8 is a diagram illustrating an example of a configuration of a television receiver apparatus 720 according to the embodiment of the present invention.

FIG. 8 is a diagram illustrating an example of a configuration of the television receiver apparatus 720 according to the embodiment of the present invention. The connection relationship between the reproducing apparatus 710 and the television receiver apparatus 720 is the same as that shown in the example of FIG. 7. Note that a signal line 704 corresponding to the CEC line 361 is added. The television receiver apparatus 720 includes a delay-information storage unit 721, a connection-apparatus-information management unit 722, a tuner 723, a transport-signal switching unit 724, a transport-signal processor 725, a video-signal decoding unit 726, a display controller 727, and a display unit 728.

The delay-information storage unit 721 stores a period of time required for processing a video signal and an audio signal by the television receiver apparatus 720 as one of characteristic information items of the television receiver apparatus 720. The delay-information storage unit 721 is realized by an EEPROM (Electronically Erasable and Programmable Read Only Memory). In the HDMI standard, the period of time required for processing a video signal and an audio signal is stored in the sync apparatus as part of the E-EDID configuration as described above, and is supplied from the sync apparatus through the display data channel (DDC) to the source apparatus. Note that, as another embodiment, the video processing time may be transmitted through the transmission paths (the reserved line 362 and the HPD line 363) for Ethernet (registered trademark) signals.

The connection-apparatus-information management unit 722 manages information on various apparatuses which are directly or indirectly connected to the television receiver apparatus 720 and which are included in the AV system. The information on various apparatuses may be information on whether a decoder used to decode a specific encoded signal is included, for example. In this example, the connection-apparatus-information management unit 722 is connected to the reproducing apparatus 710 through the signal line 704, and obtains information on the reproducing apparatus 710. In the HDMI standard, presences of other apparatuses are detected through the CEC line 361, and managements of the apparatuses are performed.

The tuner 723 receives a broadcast signal so as to select a channel. In a case of digital broadcasting, a signal in accordance with the transport stream (TS) method of MPEG-2 is generally obtained as the broadcast signal.

The transport-signal switching unit 724 outputs a transport signal obtained by the tuner 723 to the transport-signal processor 725 or the reproducing apparatus 710 by selecting one of the transport-signal processor 725 and the reproducing apparatus 710. In this selection, the transport-signal switching unit 724 selects one of them in accordance with the information managed in the connection-apparatus-information management unit 722. For example, if a decoder used to decode the broadcast signal included in another apparatus is available, decoding processing may be requested to the apparatus. Furthermore, the selection may be automatically performed in accordance with the information managed in the connection-apparatus-information management unit 722, and alternatively, one of the apparatuses may perform the decoding processing in accordance with a user's instruction.

The transport-signal processor 725 separates an encoded video signal and an encoded audio signal from the transport signal output from the transport-signal switching unit 724. Operation of the transport-signal processor 725 is the same as that of the transport-signal processor 713.

The video-signal decoding unit 726 decodes the encoded video signal obtained by the separation operation of the transport-signal processor 725. Operation of the video-signal decoding unit 726 is the same as that of the video-signal decoding unit 714.

The display controller 727 selects the video signal decoded by the video-signal decoding unit 726 or the video signal decoded by the reproducing apparatus 710, and outputs the selected video signal to the display unit 728 for display. In this selection, the display controller 727 determines a video signal to be selected in accordance with the information managed in the connection-apparatus-information management unit 722. For example, if a decoder used to decode the broadcast signal included in another apparatus is available, a video signal decoded by the apparatus may be selected. Furthermore, the selection may be automatically performed in accordance with the information managed in the connection-apparatus-information management unit 722, and alternatively, a video signal decoded by one of the apparatuses may be selected in accordance with a user's instruction.

The display unit 728 displays the video signal output from the display controller 727, and is realized by an LCD (Liquid Crystal Display), for example.

FIG. 9 is a diagram illustrating an example of a data configuration stored in the delay information storage unit 721 according to the embodiment of the present invention. This data configuration is based on VSDB (Vendor-Specific Data Block) complying with the HDMI standard, and includes a vendor tag code, a block length, a licensor identifier, a physical address, expansion information, a video delay amount, an audio delay amount, an interlace video delay amount, and an interlace audio delay amount.

The vendor tag code corresponds to a region of three bits which stores a number representing this data configuration, and is "3". The block length corresponds to a region of five bits which stores the number of bytes (N) of this data configuration. The licensor identifier corresponds to a region of three bytes which stores an identifier assigned to the organization of the HDMI standard. The physical address corresponds to a region of two bytes which stores a physical address of the source apparatus which is used by the CEC line 361. The expansion information corresponds to a region of three bytes which stores information on support of an expansion function. Note that the expansion information includes effective bits of the following delay amounts.

The video delay amount corresponds to a region of one byte which stores a period of time (video processing time) from when the television receiver apparatus 720 receives a video signal to when a video image is actually displayed provided that the video signal is in a progressive form. The audio delay amount corresponds to a region of one byte which stores a period of time from when the television receiver apparatus 720 receives an audio signal corresponding to the video signal to when sound is actually output provided that the video signal is in a progressive form. The interlace video delay amount corresponds to a region of one byte which stores a period of time from when the television receiver apparatus 720 receives a video signal to when a video image is actually displayed provided that the video image is in an interlace form. The interlace audio delay amount corresponds to a region of one byte which stores a period of time from when the television receiver apparatus 720 receives an audio signal corresponding to the video signal to when sound is actually output when the video signal is in an interlace form.

Note that the interlace audio delay amount is followed by a reserved region, and a region of the data configuration corresponds to a block length (N bytes).

The delay-information obtaining unit 716 of reproducing apparatus 710 serving as the source apparatus obtains the video delay amount or the interlace video delay amount in the data configuration as delay information. That is, when the video signal is in a progressive form, the video delay amount corresponds to the delay information whereas when the video signal is in an interlace form, the interlace video delay amount corresponds to the delay information. The audio-signal delaying unit 717 delays an audio signal supplied from the audio-signal decoding unit 715 by a period of time obtained by subtracting a period of time (audio processing time) in which an audio signal is processed in the reproducing apparatus 710 from the obtained delay information. By this, a video image displayed in the television receiver apparatus 720 and sound output from the speaker 750 are synchronized with each other, and lip sync is ensured.

Figure 10:
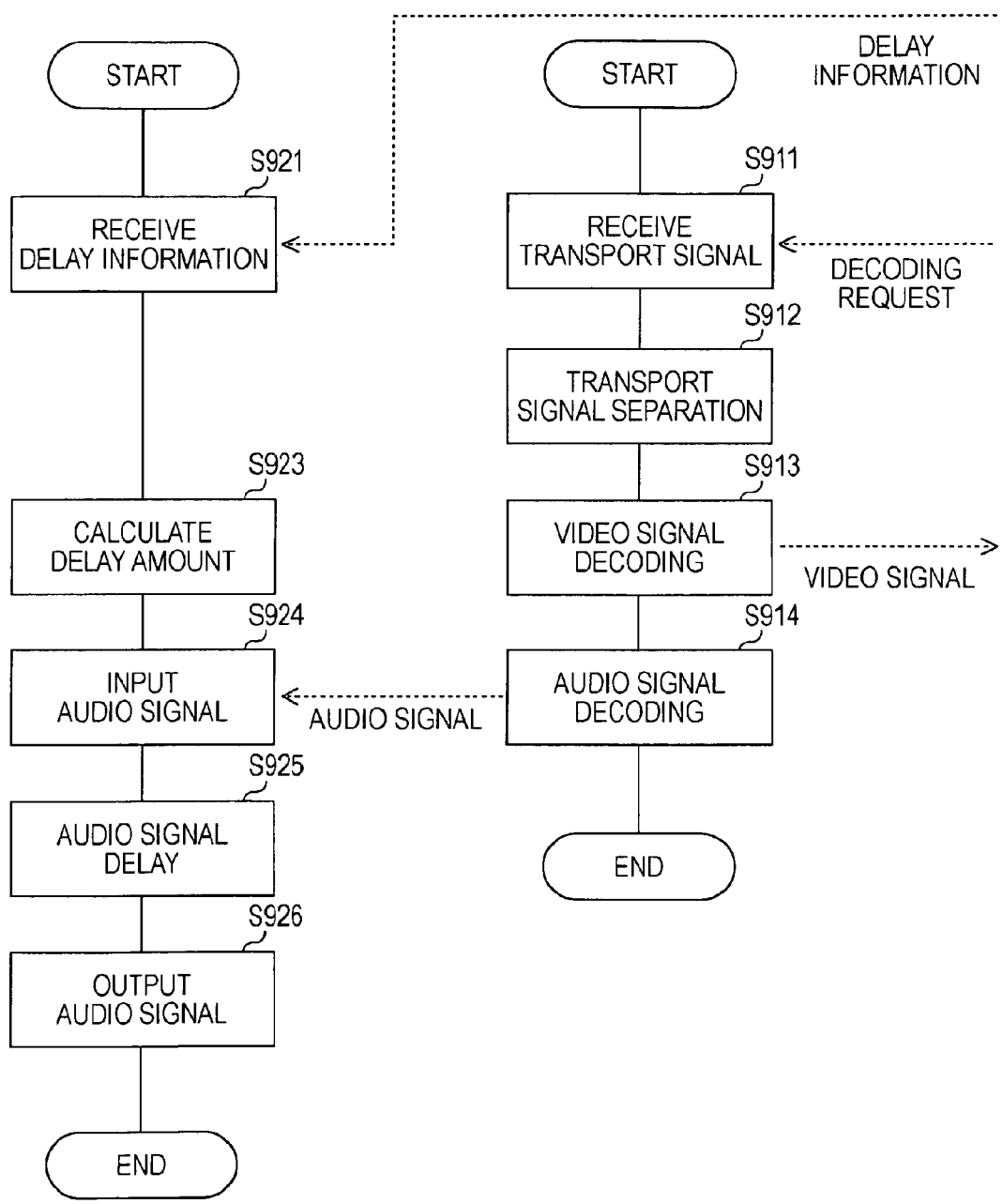
FIG. 10 is a diagram illustrating an example of a procedure of processing of the reproducing apparatus 710 according to the embodiment of the present invention.

FIG. 10 is a diagram illustrating an example of a procedure of processing of the reproducing apparatus 710 according to the embodiment of the present invention. In FIG. 10, a procedure of processing of the player unit 730 is shown on the right side, and a procedure of processing of the amplifier unit 740 is shown on the left side. Here, it is assumed that a transport signal output from the television receiver apparatus 720 is selected by the input selection unit 712.

When receiving a transport signal supplied from the television receiver apparatus 720 through the input selection unit 712 (in step S911), the transport-signal processor 713 separates a video signal and an audio signal from the transport signal (in step S912). The video-signal decoding unit 714 decodes the separated video signal and supplies it to the television receiver apparatus 720 (in step S913). Furthermore, the audio-signal decoding unit 715 decodes the separated audio signal and supplies it to the audio-signal delaying unit 717 (in step S914).

The delay-information obtaining unit 716 receives the delay information from the television receiver apparatus 720 through the signal line 703 (DDC) (in step S921). The audio-signal delaying unit 717 calculates a delay amount by subtracting the audio processing time of the reproducing apparatus 710 from the obtained delay information (in step S923). Then, the audio-signal delaying unit 717 receives the supplied audio signal from the audio-signal decoding unit 715 (in step S924), delays the audio signal in accordance with the delay amount (in step S925), and output the audio signal to the speaker 750 (in step S926).

Figure 11:
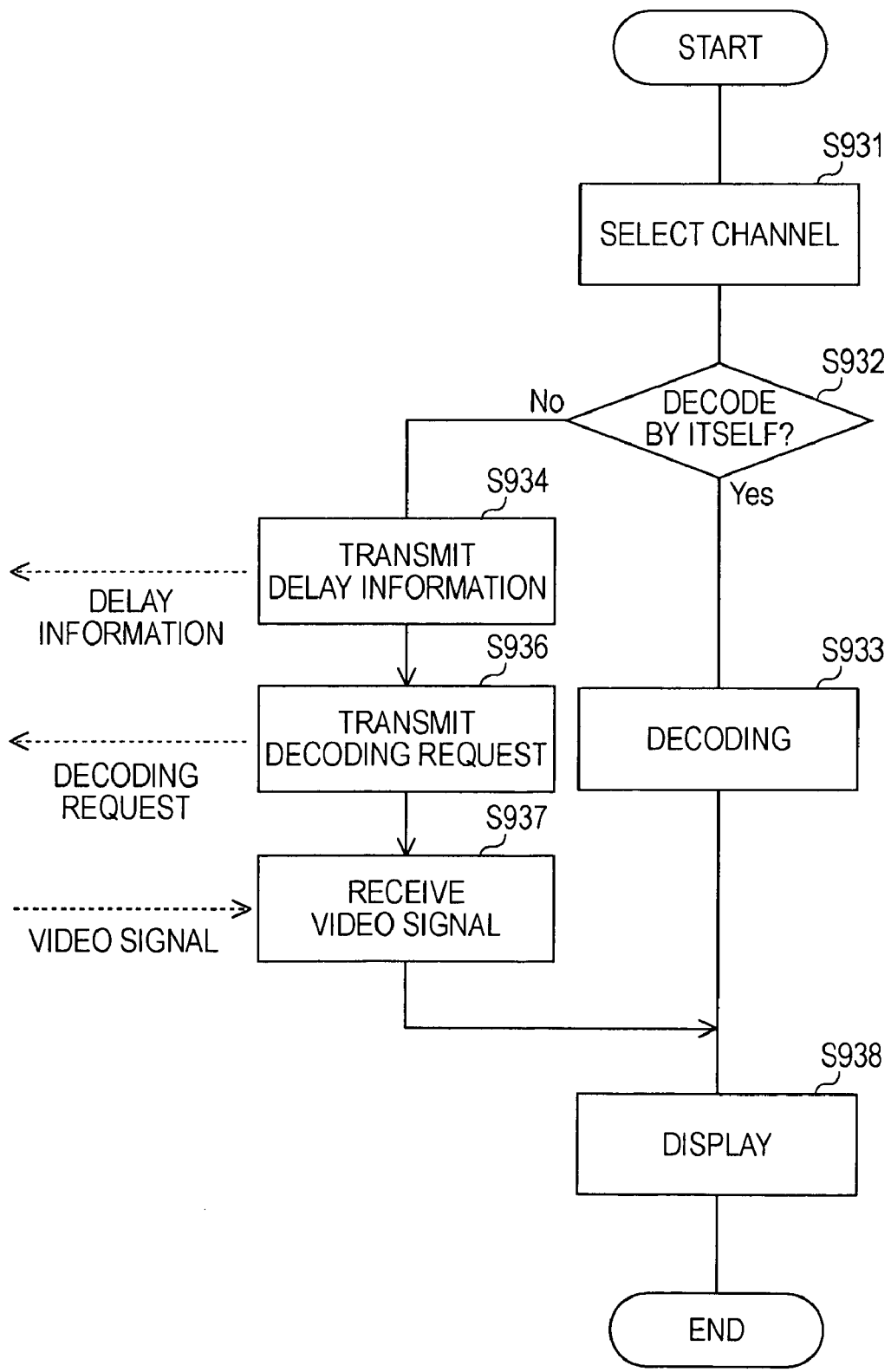
FIG. 11 is a diagram illustrating an example of a procedure of processing of the television receiver apparatus 720 according to the embodiment of the present invention.

FIG. 11 is a diagram illustrating an example of a procedure of processing of the television receiver apparatus 720 according to the embodiment of the present invention.

When the tuner 723 selects a broadcast signal including the transport signal (in step S931), the transport-signal switching unit 724 determines whether the transport signal is to be decoded in the television receiver apparatus 720 (in step S932). At this time, the transport-signal switching unit 724 may make the determination in accordance with the information managed in the connection-apparatus-information management unit 722 or in accordance with a user's instruction.

When it is determined that the transport signal is to be decoded in the television receiver apparatus 720 (in step S932), the transport-signal processor 725 separates a video signal from the transport signal, and the separated video signal is decoded by the video-signal decoding unit 726 (in step S933).

On the other hand, when it is determined that a decoding request is supplied to the reproducing apparatus 710 (in step S932), the transport-signal switching unit 724 outputs the transport signal included in the broadcast signal to the reproducing apparatus 710 through the signal line 708 (in step S936). Before this operation, the delay information stored in the delay-information storage unit 721 is supplied to the reproducing apparatus 710 through the signal line 703 in advance (in step S934). The display controller 727 receives the video signal decoded by the reproducing apparatus 710 (in step S937).

The display controller 727 selects the video signal decoded by the video-signal decoding unit 726 or the video signal decoded by the reproducing apparatus 710, and displays the selected video signal in the display unit 728 (in step S938).

Note that, in the example, it is assumed that the display data channel 350 complying with the HDMI standard is employed when the delay information is transmitted. However, the delay information may be transmitted as an Ethernet (registered trademark) signal using the reserved line 362 and the HPD line 363.

Next, an example of another system configuration when an HDMI expanded apparatus is connected through the interface described above will be described.

Figure 12:
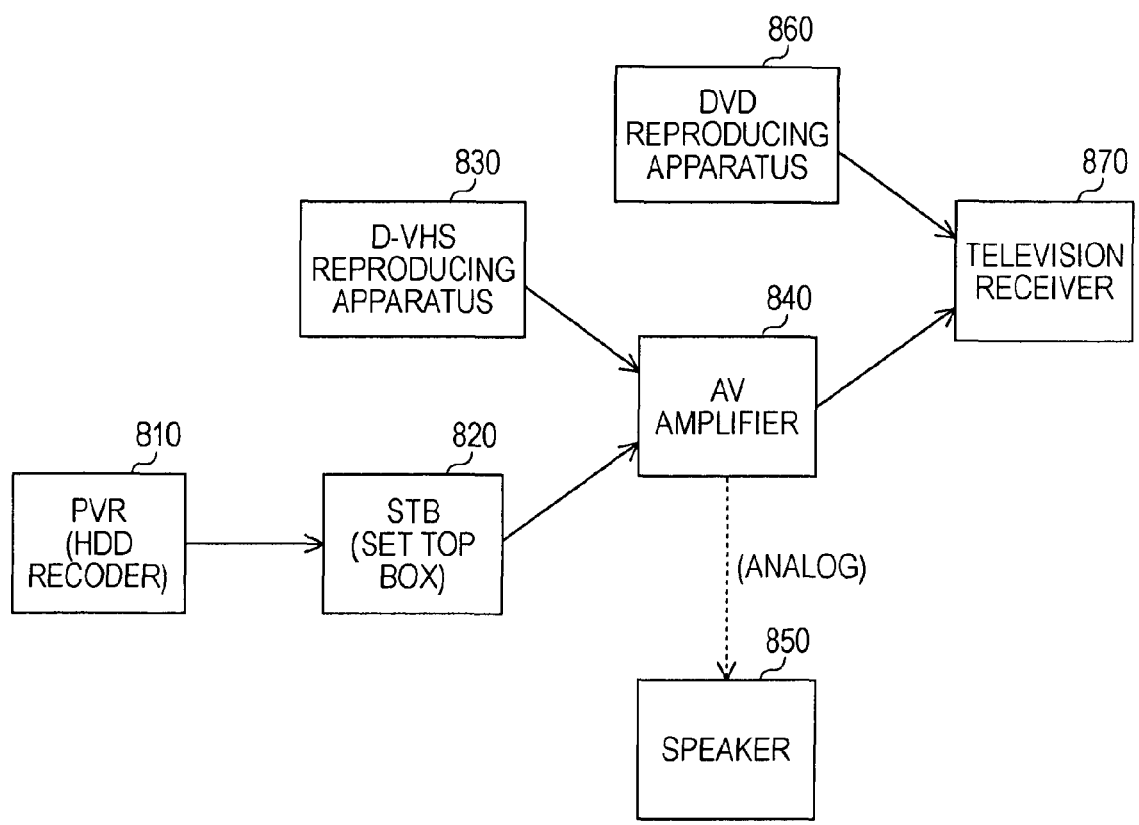
FIG. 12 is a diagram illustrating an example of another system configuration according to the embodiment of the present invention.

FIG. 12 is a diagram illustrating an example of another system configuration according to the embodiment of the present invention. In this configuration example, a PVR (Personal Video Recorder: hard disk drive recorder) 810, an STB (Set Top Box) 820, a D-VHS (Data Video Home System) reproducing apparatus 830, an AV amplifier 840, a DVD (Digital Versatile Disk) reproducing apparatus 860, and a television receiver apparatus 870 are connected through the interface described above. In FIG. 12, sources of arrows denote source apparatuses, and destinations of the arrows denote sync apparatuses. Furthermore, a speaker 850 is connected to the AV amplifier 840 through an analog signal line.

When a normal HDMI cable is used, a video signal and an audio signal are supplied from a source apparatus to a sync apparatus, and therefore, in this connection example, it is possible to output a signal reproduced by the DVD reproducing apparatus 860 from the television receiver apparatus 870, but it is not possible to output an audio signal from the speaker 850. On the other hand, since the interface described with reference to FIGS. 3 to 6 may perform bi-directional transmission of signals, it is possible to transmit the audio signal from the television receiver apparatus 870 to the AV amplifier 840.

Figure 13:
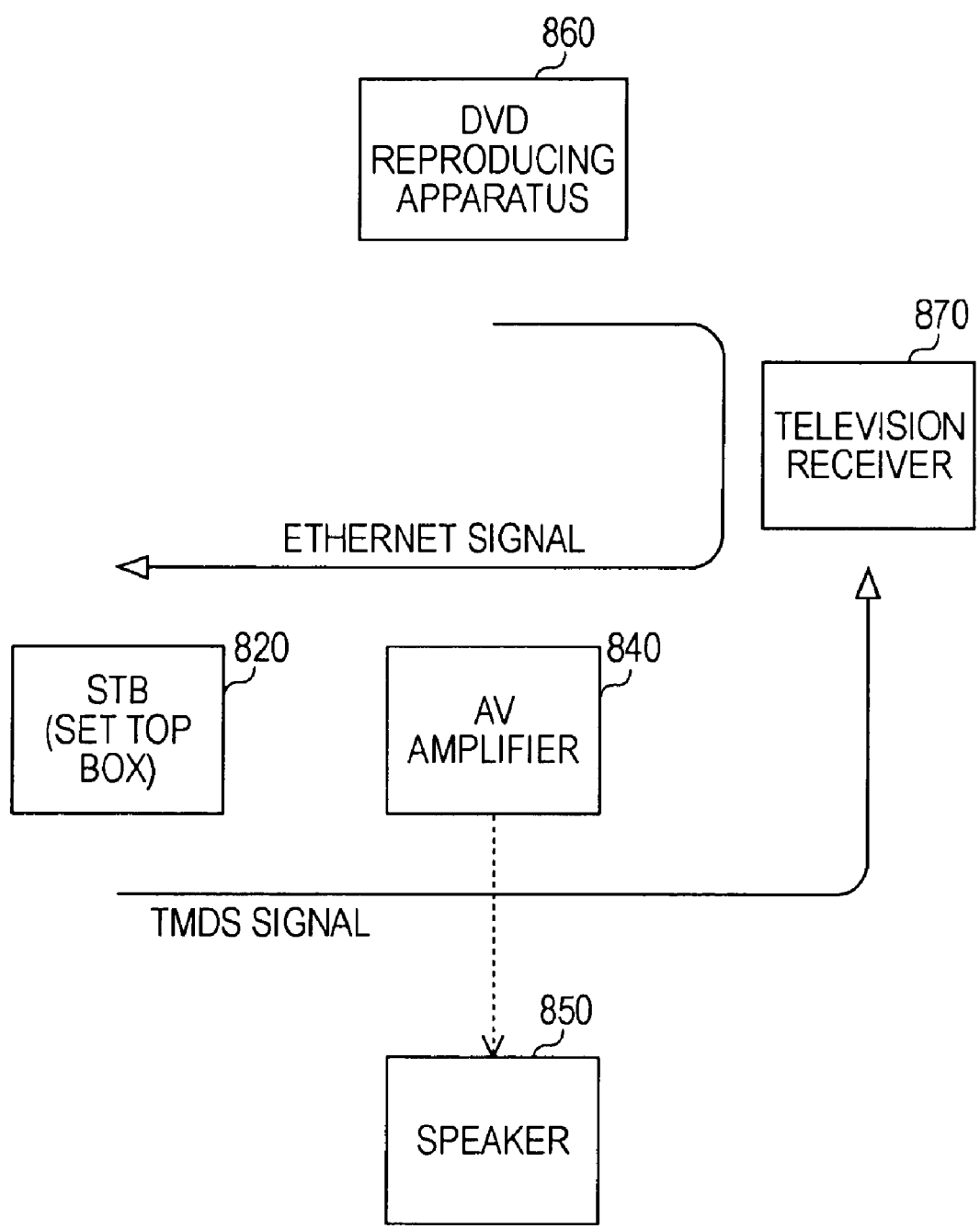
FIG. 13 is a diagram illustrating a path of an audio signal in the example of the other system configuration according to the embodiment of the present invention.

FIG. 13 is a diagram illustrating a path of an audio signal in the example of the other system configuration according to the embodiment of the present invention.

In this example, it is assumed that a decoding request is transmitted to the STB 820 and sound is output from the speaker 850. An encoded video signal and an encoded audio signal read from a DVD by the DVD reproducing apparatus 860 are transmitted as Ethernet (registered trademark) signals through the reserved line 362 and the HPD line 363 to the STB 820.

The STB 820 which has a configuration the same as that of the player unit 730 described with reference to FIG. 7 decodes the encoded video signal and the encoded audio signal. The video signal and the audio signal decoded by the STB 820 are supplied to the AV amplifier 840 through the TMDS channels 310 to 330.

The AV amplifier 840 transmits the video signal to the television receiver apparatus 870 through the TMDS channels 310 to 330, delays the audio signal using a configuration the same as that of the amplifier unit 740 described with reference to FIG. 7, and outputs the delayed audio signal to the speaker 850.

As described above, according to the embodiment of the present invention, in the system using the interface based on the single-directional transmission such as the interface complying with the HDMI standard, flexible reproduction is performed irrespective of a connection state of apparatuses. Furthermore, at this time, synchronization (lip sync) between a reproduced video image and reproduced sound is ensured.

Figure 14:
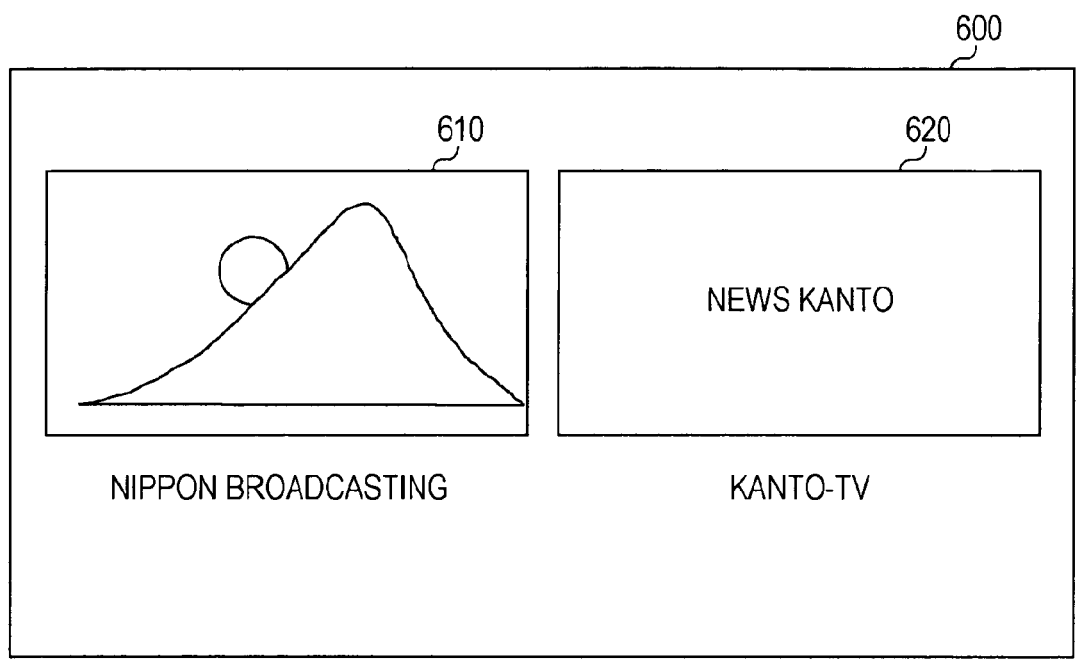
FIG. 14 is a diagram illustrating an example of a screen display according to the embodiment of the present invention.

Moreover, according to the embodiment of the present invention, since a request for decoding processing may be supplied to another apparatus, flexible reproduction is performed without restrictions of the number of decoders in an apparatus and a version of the apparatus. For example, when the television receiver apparatus 870 includes a single decoder, a single broadcast signal is decoded by the apparatus, and a request for decoding of another broadcast signal is supplied to another apparatus, and accordingly, display of a plurality of broadcast programs may be performed in display screens 610 and 620 of a screen 600 shown in FIG. 14. That is, assuming that the number of the video decoding units and the audio decoding units is each set to n (n is an integer number equal to or larger than 0), n or more video images or sounds may be output.

Next, a modification of the embodiment of the present invention will be described.

Figure 15:
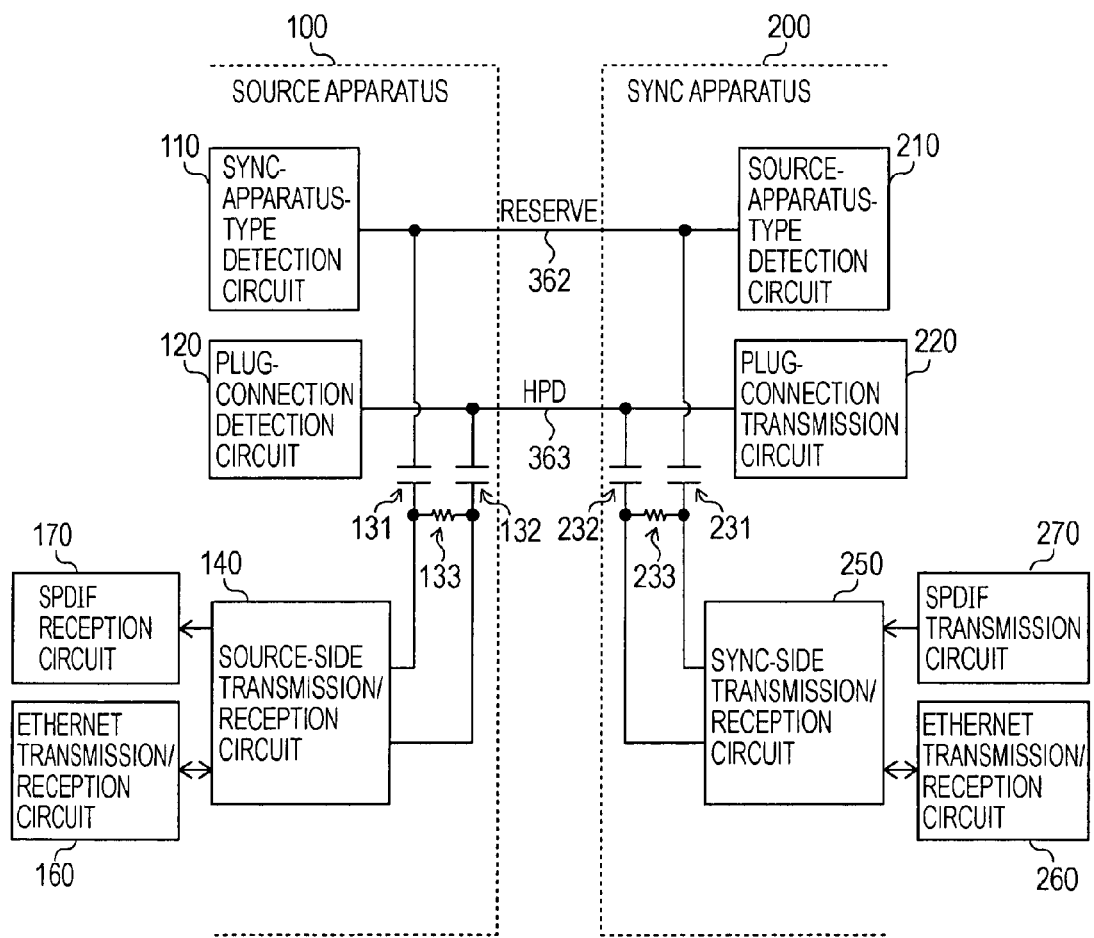
FIG. 15 is a diagram illustrating examples of modifications of internal configurations of the source apparatus 100 and the sync apparatus 200.

FIG. 15 show diagrams illustrating examples of modifications of internal configurations of the source apparatus 100 and the sync apparatus 200. Here, similarly to FIG. 3, configurations regarding the reserved line 362 and the HPD line 363 are shown. When compared with the configuration examples of FIG. 3, an SPDIF (Sony Philips Digital Inter-Face) reception circuit 170 is added to the source apparatus 100, and an SPDIF transmission circuit 270 is added to the sync apparatus 200.

The SPDIF reception circuit 170 and the SPDIF transmission circuit 270 perform single-directional communication complying with an SPDIF standard. Note that, the SPDIF standard is an interface standard used to transmit digital audio signals in real time, and is standardized as "IEC 60958" in the IEC (International Electrotechnical Commission). An SPDIF signal transmitted in accordance with the SPDIF standard includes a clock component for bi-phase mark modulation. Note that the SPDIF reception circuit 170 and the SPDIF transmission circuit 270 are realized by the related art.

FIG. 16 shows diagrams illustrating examples of modifications of configurations of the source-side transmission/reception circuit 140 and the sync-side transmission/reception circuit 250 according to the embodiment of the present invention.

As shown in (a) of FIG. 16, the sync-side transmission/reception circuit 250 includes the amplifiers 510, 520, 530, and 550, the inverter 541, the adder 542, and adders 571, and 572. That is when compared with the configuration example in (a) of FIG. 4, this configuration additionally includes the adders 571 and 572.

The adder 571 is a circuit which adds a signal supplied from the SPDIF transmission circuit 270 through a signal line 561 and a positive output from the amplifier 520 to each other. The adder 572 and the adder 571 are circuits which add signals supplied from the SPDIF transmission circuit 270 through a signal line 561 and a negative output from the amplifier 520 to each other.

That is, although Ethernet (registered trademark) signals output from the amplifier 550 are differential signals, SPDIF signals superimposed in the adders 571 and 572 are in-phase signals. Accordingly, both the Ethernet (registered trademark) signals and the SPDIF signals may be transmitted in the same pair of signal lines (the reserved line 362 and the HPD line 363).

As shown in (b) of FIG. 16, the source-side transmission/reception circuit 140 includes the amplifiers 410, 420, 430, and 450, the inverter 441, and the adder 442, and an adder 460. That is, when compared with the configuration example in (b) of FIG. 4, this configuration additionally includes adder 460.

The adder 460 is a circuit which adds a positive signal and a negative signal output from the amplifier 420 to each other. That is, among signals transmitted through the reserved line 362 and the HPD line 363, differential signals are extracted by the amplifier 430 as Ethernet (registered trademark) signals, and in-phase signals are extracted by the adder 460 as SPDIF signals. An output from the adder 460 is supplied to the SPDIF reception circuit 170.

Figure 17:
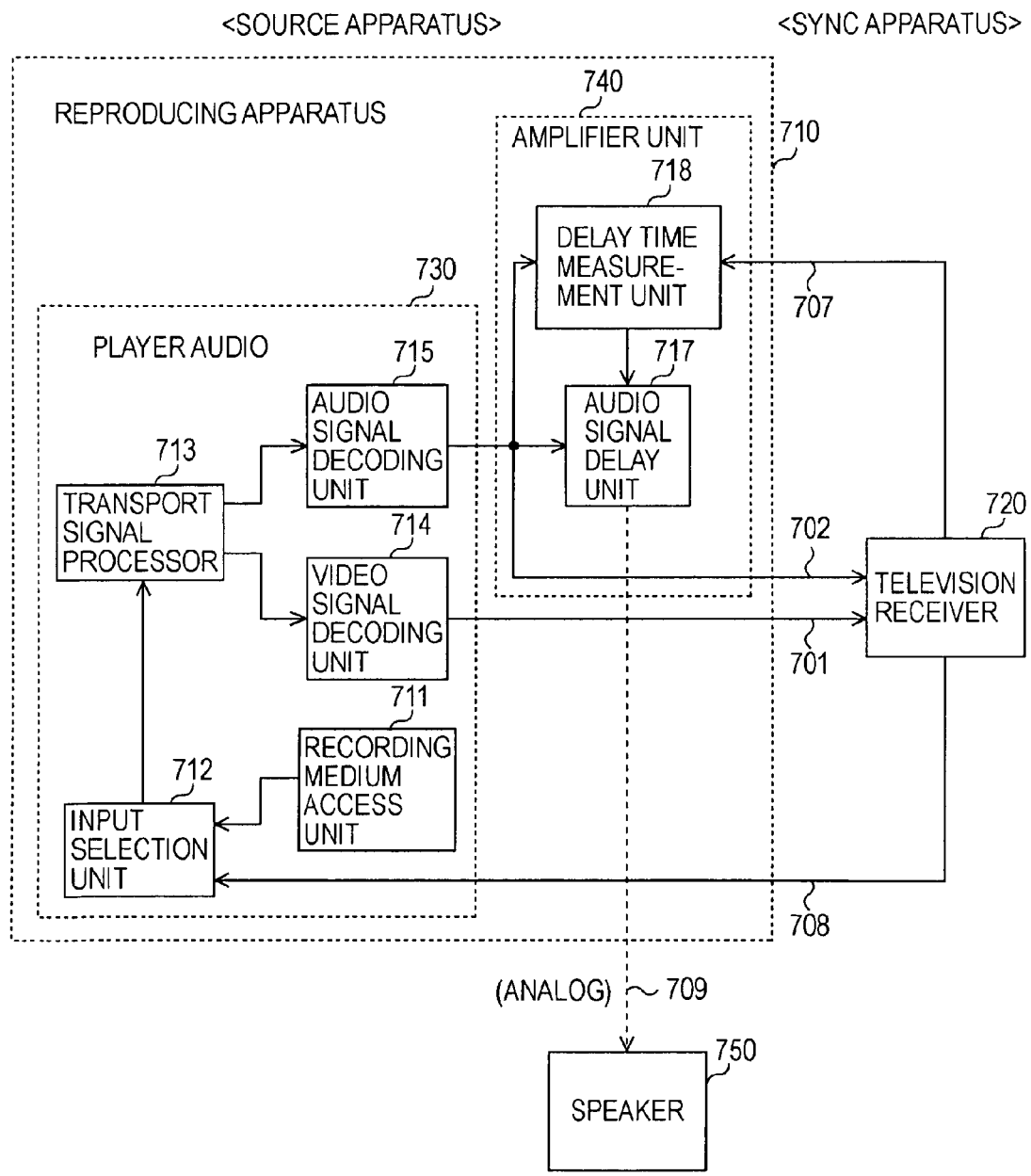
FIG. 17 is a diagram illustrating an example of a modification of the reproducing apparatus 710 according to the embodiment of the present invention.

FIG. 17 is a diagram illustrating an example of a modification of the reproducing apparatus 710 according to the embodiment of the present invention. In this modification, a signal line 707 used to transit SPDIF signals and a signal line 702 used to transmit audio signals are added to the configuration example shown in FIG. 7. Note that, as described above, an SPDIF signal may be superimposed with an Ethernet (registered trademark) signal so as to be transmitted through the same pair of signal lines (the reserved line 362 and the HPD line 363), and therefore, the transmission is realized without physically adding a cable. Furthermore, since the signal line 702 and the signal line 701 are realized by the TMDS channels 310 to 330, the signal line 702 is realized without physically adding a cable.

In this modification, instead of the delay-information obtaining unit 716 shown in FIG. 7, a delay-time measurement unit 718 is provided. Then, an audio signal output from the audio-signal decoding unit 715 is supplied to the delay-time measurement unit 718, and is also supplied to the television receiver apparatus 720 through the signal line 702. The delay-time measurement unit 718 measures a difference (displacement), as video processing time, between an audio signal returned from the television receiver apparatus 720 through the signal line 707 and an audio signal output from the audio-signal decoding unit 715.

In this case, the delay-time measurement unit 718 may obtain the video processing time in accordance with the cross-correlation between the audio signal returned from the television receiver apparatus 720 and the audio signal output from the audio-signal decoding unit 715. Furthermore, a signal for measurement having a specific pattern is transmitted, and a response to the signal for measurement is transmitted from the television receiver apparatus 720 to the delay-time measurement unit 718 so that a response time thereof is obtained as the video processing time.

Figure 18:
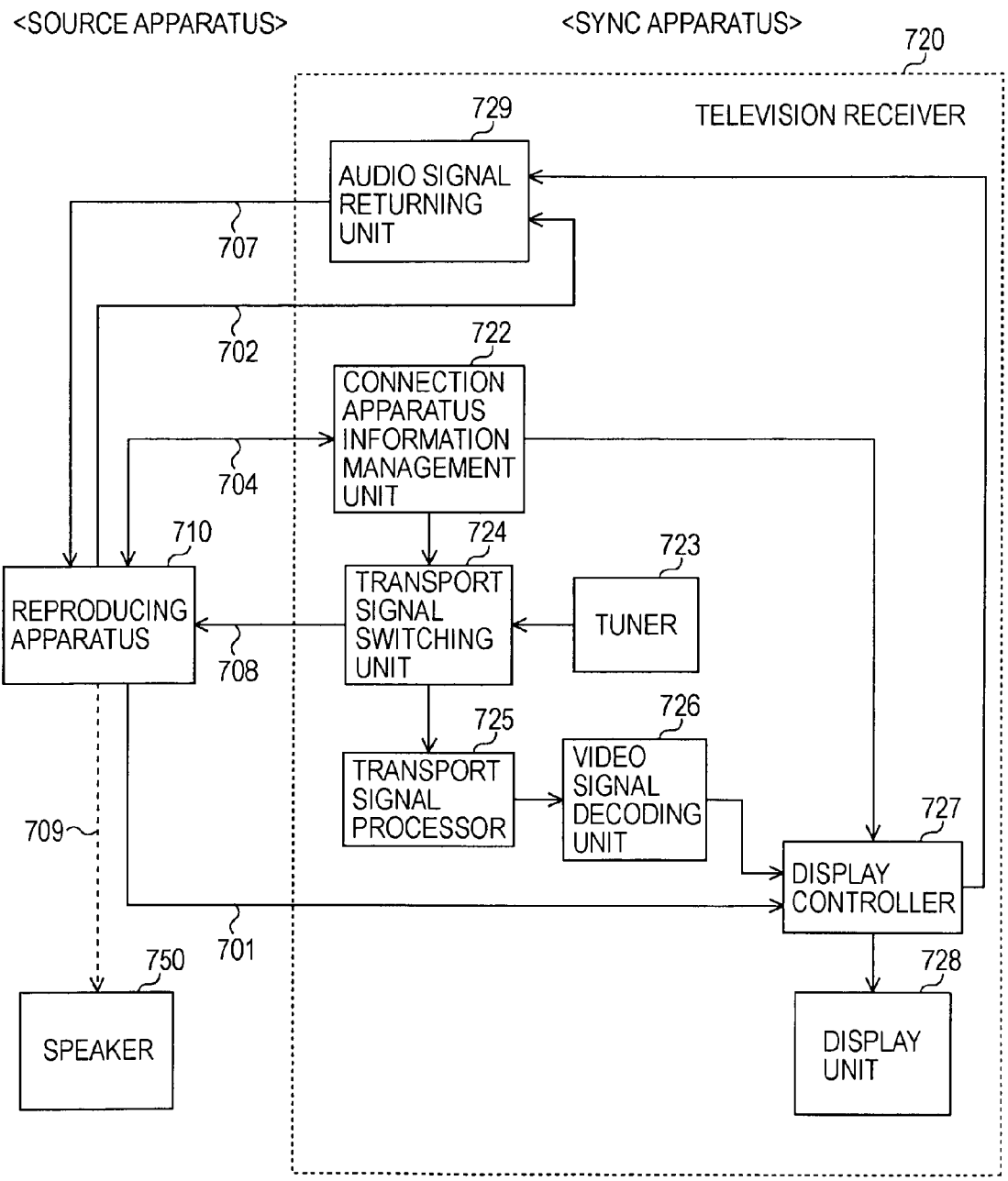
FIG. 18 is a diagram illustrating an example of a modification of a configuration of the television receiver apparatus 720 according to the embodiment of the present invention.

FIG. 18 is a diagram illustrating an example of a modification of a configuration of the television receiver apparatus 720 according to the embodiment of the present invention. The connection relationship between the reproducing apparatus 710 and the television receiver apparatus 720 is the same as that shown in FIG. 17. Note that the signal line 704 corresponding to the CEC line 361 is added.

In this modification, instead of the delay-information storage unit 721 shown in FIG. 8, an audio-signal returning unit 729 is provided. The audio-signal returning unit 729 returns, at a timing when a video signal decoded by the reproducing apparatus 710 is displayed in the display unit 728, an audio signal temporally corresponding to the video signal to the reproducing apparatus 710 through the signal line 707. The timing when a video signal is displayed in the display unit 728 is transmitted from the display controller 727 to the audio-signal returning unit 729.

Figure 19:
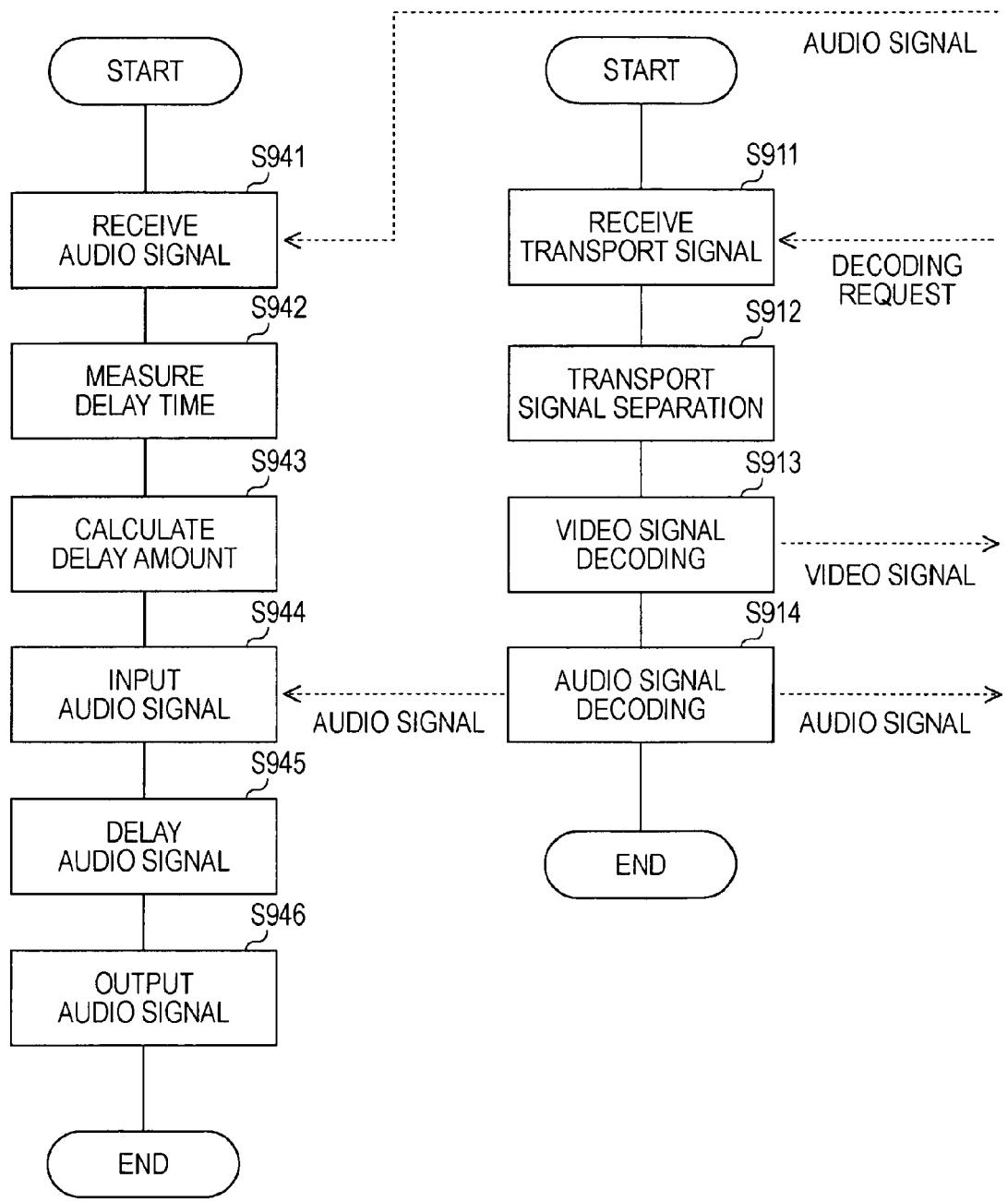
FIG. 19 is a diagram illustrating an example of a modification of the procedure of the processing of the reproducing apparatus 710 according to the embodiment of the present invention.

FIG. 19 is a diagram illustrating an example of a modification of the procedure of the processing of the reproducing apparatus 710 according to the embodiment of the present invention. In FIG. 19, a procedure of processing of the player unit 730 is shown on the right side, and a procedure of processing of the amplifier unit 740 is shown on the left side. Accordingly, the processing procedure on the right side of FIG. 19 is the same as the processing procedure on the right side of FIG. 10. Note that the processing procedure on the right side of FIG. 19 is different from the processing procedure on the right side of FIG. 10 in that an audio signal decoded in step S914 is transmitted to the television receiver apparatus 720.

The delay-time measurement unit 718 receives an audio signal returned from the television receiver apparatus 720 through the signal line 707 (in step S941), and measures a temporal difference between the returned audio signal and an audio signal output from the audio-signal decoding unit 715 as a delay time (video processing time) (in step S942). The audio-signal delaying unit 717 calculates a delay amount by subtracting the audio processing time in the reproducing apparatus 710 from the obtained delay time (in step S943).

Then, the audio-signal delaying unit 717 receives the audio signal supplied from the audio-signal decoding unit 715 (in step S944), delays the audio signal in accordance with the delay amount (in step S945), and outputs the audio signal to the speaker 750 (in step S946).

Figure 20:
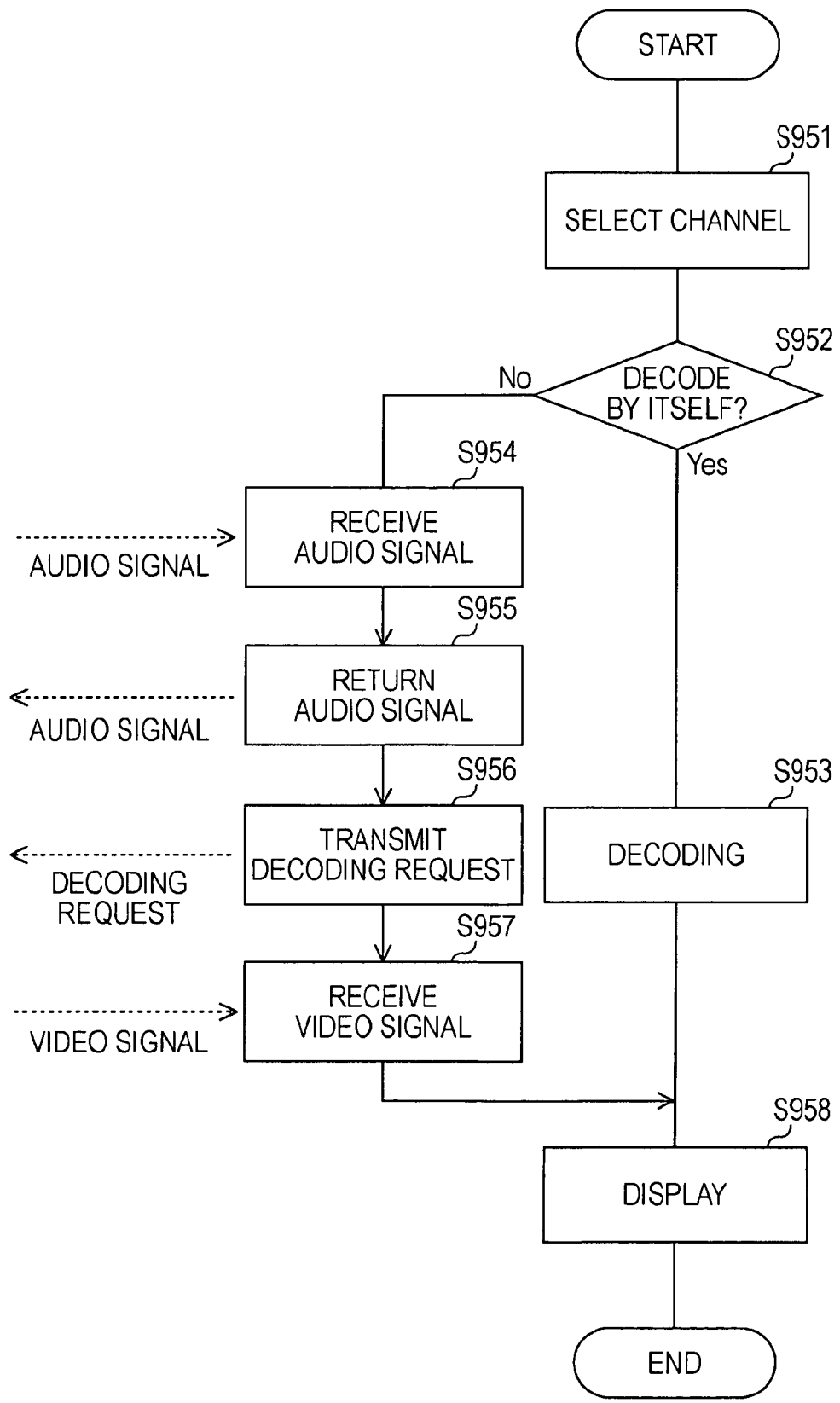
FIG. 20 is a diagram illustrating an example of a modification of the procedure of the processing of the television receiver apparatus 720 according to the embodiment of the present invention.

FIG. 20 is a diagram illustrating an example of a modification of the procedure of the processing of the television receiver apparatus 720 according to the embodiment of the present invention. The configuration of FIG. 20 is made assuming that the configuration example shown in FIG. 18 is employed.

When the tuner 723 selects a broadcast signal including a transport signal (in step S951), the transport-signal switching unit 724 determines whether the transport signal is to be decoded in the television receiver apparatus 720 (in step S952). When it is determined that the transport signal is to be decoded in the television receiver apparatus 720, the transport-signal processor 725 separates a video signal from the transport signal, and the separated video signal is decoded by the video-signal decoding unit 726 (in step S953). These operations are the same as those of FIG. 11.

On the other hand, when it is determined that a decoding request is to be transmitted to the reproducing apparatus 710 (in step S952), the transport-signal switching unit 724 outputs the transport signal included in the broadcast signal to the reproducing apparatus 710 through the signal line 708 (in step S956). Before this operation, the audio-signal returning unit 729 receives an audio signal from the reproducing apparatus 710 through the signal line 702 (in step S954), and returns, at a timing when a video signal decoded by the reproducing apparatus 710 is displayed in the display unit 728, an audio signal temporally corresponding to the video signal to the reproducing apparatus 710 through the signal line 707 (in step S955). The display controller 727 receives the video signal decoded by the reproducing apparatus 710 (in step S957).

According to this modification, synchronization of a reproduced video image and reproduced sound is ensured by actually measuring a delay time, without storing delay information in the television receiver apparatus 720.

Note that the embodiment of the present invention is merely an example which realizes the present invention, and the elements of the embodiment have correspondence relationships with respective specific elements of the invention in the claims as described below. However, the present invention is not limited to these, and various modifications may be made without departing from the scope of the invention.

Specifically, a stream generation apparatus and a video-image outputting apparatus corresponds to the television receiver apparatus 720, for example. Furthermore, separation means corresponds to the transport-signal processor 713, for example. Moreover, video-signal decoding means corresponds to the video-signal decoding unit 714, for example. In addition, audio-signal decoding means corresponds to the audio-signal decoding unit 715, for example. Furthermore, audio-signal processing means corresponds to the amplifier unit 740, for example.

Furthermore, first reception means corresponds to the amplifier 430, for example. Moreover, second reception means corresponds to the adder 460, for example.

Furthermore, stream-signal generation means corresponds to the tuner 723, for example. Moreover, connection-information management means corresponds to the connection-apparatus-information management unit 722, for example. In addition, stream-signal switching means corresponds to the transport-signal switching unit 724, for example. Furthermore, display means corresponds to the display unit 728, for example. Moreover, display control means corresponds to the display controller 727, for example. In addition, video-processing-time supplying means corresponds to the delay-information storage unit 721, for example.

Furthermore, separation means corresponds to the transport-signal processor 725, for example. Moreover, video-signal decoding means corresponds to the video-signal decoding unit 726, for example.

Furthermore, video-signal decoding means corresponds to the video-signal decoding unit 726, for example.

Moreover, audio-signal returning means corresponds to the audio-signal returning unit 729, for example.

Furthermore, first transmission means corresponds to the amplifier 520, for example. Moreover, second transmission means corresponds to the adders 571 and 572, for example.

Furthermore, a reception step corresponds to step S911, for example. Moreover, a separation step corresponds to step S912, for example. In addition, a video-signal decoding step corresponds to step S913, for example. Furthermore, an audio-signal decoding step corresponds to step S914, for example. Moreover a video-signal-processing-time obtaining step corresponds to step S921, for example. In addition, an audio-signal delaying step corresponds to step S923 to step S926, for example.

Furthermore, connection-information management means corresponds to the connection-apparatus-information management unit 722, for example. Moreover, display means corresponds to the display unit 728, for example. In addition, display control means corresponds to the display controller 727, for example. Furthermore, a stream-signal generation step corresponds to step S931, for example. Moreover, a determination step corresponds to step S932, for example. In addition, a video-processing-time supplying step corresponds to step S934, for example. Furthermore, a stream-signal switching step corresponds to step S936, for example. Moreover, a display control step corresponds to step S937 and step S938, for example.

Note that the processing steps described in the embodiment of the present invention may be perceived as a method including a series of the steps, or may be perceived as a program which makes a computer execute the series of the steps or a recording medium storing the program.

The invention claimed is:

1. A reproducing apparatus, comprising:
    separation means for receiving a stream signal including an encoded video signal and an encoded audio signal from a stream generation apparatus and separating the encoded video signal and the encoded audio signal from the stream signal;
    video-signal decoding means for decoding the encoded video signal and outputting the decoded video signal to a video-image outputting apparatus;
    audio-signal decoding means for decoding the encoded audio signal to generate a decoded audio signal and outputting the decoded audio signal to the video-image outputting apparatus; and
    audio-signal processing means for measuring a temporal difference between an audio signal returned from the video-image outputting apparatus and the audio signal decoded by the audio-signal decoding means as video processing time, delaying the audio signal in accordance with the video processing time, and thereafter supplying the delayed audio signal to an audio outputting apparatus.

2. The reproducing apparatus according to claim 1, wherein the audio-signal processing means obtains the video processing time through a control signal line connected between the audio-signal processing means and the video-image outputting apparatus.

3. The reproducing apparatus according to claim 2, wherein the control signal line corresponds to a display data channel (DDC) included in an HDMI cable.

4. The reproducing apparatus according to claim 1, wherein the separation means receives the stream signal through a data signal line connected between the separation means and the stream generation apparatus.

5. The reproducing apparatus according to claim 4, wherein the stream generation apparatus is included in the video-image outputting apparatus, and the audio-signal processing means obtains the video processing time through the data signal line.

6. The reproducing apparatus according to claim 4, wherein the data signal line corresponds to a reserved line and a hot-plug detection line included in an HDMI cable.

7. A reproducing apparatus, comprising:
separation means for receiving a stream signal including an encoded video signal and an encoded audio signal from a stream generation apparatus and separating the encoded video signal and the encoded audio signal from the stream signal;
video-signal decoding means for decoding the encoded video signal and outputting the decoded video signal to a video-image outputting apparatus;
audio-signal decoding means for decoding the encoded audio signal to generate a decoded audio signal and outputting the decoded audio signal to the video-image outputting apparatus;
audio-signal processing means for measuring a temporal difference between an audio signal returned from the video-image outputting apparatus and the audio signal decoded by the audio-signal decoding means as video processing time, delaying the audio signal in accordance with the video processing time, and thereafter supplying the delayed audio signal to an audio outputting apparatus;
first reception means for extracting the stream signal from a difference signal received through a data signal line connected between the first reception means and the video-image outputting apparatus; and
second reception means for extracting the returned audio signal from an in-phase signal received through the data signal line.

8. The reproducing apparatus according to claim 7, wherein the data signal line corresponds to a reserved line and a hot-plug detection line included in an HDMI cable.

9. The reproducing apparatus according to claim 7, wherein the audio-signal processing means obtains the video processing time through a control signal line connected between the audio-signal processing means and the video-image outputting apparatus.

10. The reproducing apparatus according to claim 9, wherein the control signal line corresponds to a display data channel (DDC) included in an HDMI cable.

11. The reproducing apparatus according to claim 7, wherein the separation means receives the stream signal through a data signal line connected between the separation means and the stream generation apparatus.

12. The reproducing apparatus according to claim 11, wherein the stream generation apparatus is included in the video-image outputting apparatus, and the audio-signal processing means obtains the video processing time through the data signal line.

13. A reproducing method, comprising:
a reception step of receiving a stream signal including an encoded video signal and an encoded audio signal from a stream generation apparatus;
a separation step of separating the encoded video signal and the encoded audio signal from the stream signal;
a video-signal decoding step of decoding the encoded video signal and outputting a decoded video signal to a video-image outputting apparatus;
an audio-signal decoding step of decoding the encoded audio signal so that a decoded audio signal is generated and outputting the decoded audio signal to the video-image outputting apparatus;
a video-processing-time obtaining step of measuring a temporal difference between an audio signal returned from the video-image outputting apparatus and the audio signal decoded in the audio-signal decoding step as video processing time; and
an audio-signal delaying step of delaying the audio signal in accordance with the video processing time, and thereafter supplying the delayed audio signal to an audio outputting apparatus.

14. A reproducing apparatus, comprising:
a separation unit that receives a stream signal including an encoded video signal and an encoded audio signal from a stream generation apparatus and separates the encoded video signal and the encoded audio signal from the stream signal;
a video-signal decoding unit that decodes the encoded video signal and outputs the decoded video signal to a video-image outputting apparatus;
audio-signal decoding unit that decodes the encoded audio signal to generate a decoded audio signal and outputs the decoded audio signal to the video-image outputting apparatus; and
audio-signal processing unit that measures a temporal difference between an audio signal returned from the video-image outputting apparatus and the audio signal decoded by the audio-signal decoding unit as video processing time, delays the audio signal in accordance with the video processing time, and thereafter supplies the delayed audio signal to an audio outputting apparatus.

15. The reproducing apparatus according to claim 14, wherein the audio-signal processing unit obtains the video processing time through a control signal line connected between the audio-signal processing unit and the video-image outputting apparatus.

16. The reproducing apparatus according to claim 15, wherein the control signal line corresponds to a display data channel (DDC) included in an HDMI cable.

17. The reproducing apparatus according to claim 14, wherein the separation unit receives the stream signal through a data signal line connected between the separation unit and the stream generation apparatus.

18. The reproducing apparatus according to claim 17, wherein the stream generation apparatus is included in the video-image outputting apparatus, and the audio-signal processing unit obtains the video processing time through the data signal line.

19. The reproducing apparatus according to claim 17, wherein the data signal line corresponds to a reserved line and a hot-plug detection line included in an HDMI cable.

20. A reproducing apparatus, comprising:
a separation unit that receives a stream signal including an encoded video signal and an encoded audio signal from a stream generation apparatus and separates the encoded video signal and the encoded audio signal from the stream signal;

a video-signal decoding unit that decodes the encoded video signal and outputs the decoded video signal to a video-image outputting apparatus;

a audio-signal decoding unit that decodes the encoded audio signal to generate a decoded audio signal and outputs the decoded audio signal to the video-image outputting apparatus;

a audio-signal processing unit that measures a temporal difference between an audio signal returned from the video-image outputting apparatus and the audio signal decoded by the audio-signal decoding unit as video processing time, delays the audio signal in accordance with the video processing time, and thereafter supplies the delayed audio signal to an audio outputting apparatus;

a first reception unit that extracts the stream signal from a difference signal received through a data signal line connected between the first reception unit and the video-image outputting apparatus; and a second reception unit that extracts the returned audio signal from an in-phase signal received through the data signal line.

21. The reproducing apparatus according to claim 20, wherein the data signal line corresponds to a reserved line and a hot-plug detection line included in an HDMI cable.

22. The reproducing apparatus according to claim 20, wherein the audio-signal processing unit obtains the video processing time through a control signal line connected between the audio-signal processing unit and the video-image outputting apparatus.

23. The reproducing apparatus according to claim 22, wherein the control signal line corresponds to a display data channel (DDC) included in an HDMI cable.

24. The reproducing apparatus according to claim 20, wherein the separation unit receives the stream signal through a data signal line connected between the separation unit and the stream generation apparatus.

25. The reproducing apparatus according to claim 24, wherein the stream generation apparatus is included in the video-image outputting apparatus, and the audio-signal processing unit obtains the video processing time through the data signal line.

* * * * *